US011328597B2

(12) United States Patent
Silas

(10) Patent No.: US 11,328,597 B2
(45) Date of Patent: May 10, 2022

(54) DEFINING AND DELIVERING PARKING ZONES TO VEHICLES

(71) Applicant: Valeo Comfort and Driving Assistance, Creteil (FR)

(72) Inventor: Jake Silas, Berkley, MI (US)

(73) Assignee: Valeo Comfort and Driving Assistance, Creteil (FR)

( * ) Notice: Subject to any disclaimer, the term of this patent is extended or adjusted under 35 U.S.C. 154(b) by 93 days.

(21) Appl. No.: 16/726,027

(22) Filed: Dec. 23, 2019

(65) Prior Publication Data

US 2021/0192952 A1  Jun. 24, 2021

(51) Int. Cl.
*G08G 1/14* (2006.01)
*H04W 4/021* (2018.01)
*H04W 4/029* (2018.01)
*H04W 4/44* (2018.01)

(52) U.S. Cl.
CPC ............ *G08G 1/143* (2013.01); *H04W 4/021* (2013.01); *H04W 4/029* (2018.02); *H04W 4/44* (2018.02)

(58) Field of Classification Search
CPC .... G06Q 10/0833; G06Q 20/10; G06Q 50/30; G06Q 2240/00; G07B 15/02; G08G 1/142; G08G 1/146; G08G 1/149; G08G 1/143; G08G 1/168; H04W 4/021; H04W 4/029; H04W 4/44; B60W 2540/041; B60W 2540/30; B60W 30/06; B60W 50/038; B62D 15/0285

See application file for complete search history.

(56) References Cited

U.S. PATENT DOCUMENTS

| 2006/0227010 A1* | 10/2006 | Berstis ..................... G08G 1/14 340/932.2 |
| 2017/0345305 A1* | 11/2017 | Zheng ..................... G08G 1/144 |
| 2019/0156673 A1* | 5/2019 | Hohenacker ........... G07B 15/02 |
| 2020/0302790 A1* | 9/2020 | Humphreys ........... G08G 1/146 |
| 2021/0162989 A1* | 6/2021 | Ahn ........................ G08G 1/146 |

FOREIGN PATENT DOCUMENTS

| CN | 108230734 A | 6/2018 |
| CN | 109410638 A | 3/2019 |
| DE | 102010029419 A1 | 12/2010 |
| WO | WO2011061028 A1 | 5/2011 |
| WO | WO2018041458 A1 | 3/2018 |

* cited by examiner

*Primary Examiner* — Dionne Pendleton
(74) *Attorney, Agent, or Firm* — Weaver Austin Villeneuve & Sampson LLP

(57) ABSTRACT

Techniques are described for defining and delivering parking area information to a vehicle. The parking area information can be sent by a parking assistant device associated with a parking area and in response to receiving one or more messages from a vehicle system of the vehicle. Messages from the vehicle system indicate a location of the vehicle and are used by the parking assistant device to track a movement of the vehicle. The parking area information is sent in one or more responses messages from the parking assistant device and can include a rule for determining whether the vehicle is permitted to park in an unoccupied parking zone within the parking area or indicate a result of applying the rule.

19 Claims, 12 Drawing Sheets

DEFINING AND DELIVERING PARKING ZONES TO VEHICLES

BACKGROUND

Aspects of the disclosure relate to techniques for defining parking zones and conveying information about the parking zones to a vehicle in order to assist in parking of the vehicle.

In the context of motor vehicles, there exist systems which rely upon detailed maps of parking areas and/or high precision global positioning system (GPS) devices onboard motor vehicles that travel within the parking areas in order to wirelessly deliver map data and parking zone information from a remote server to a motor vehicle. Typically, the driver of the motor vehicle executes a software application on a mobile device such as a smartphone. The map data and parking zone information are transmitted to the software application as part of a one-way communication between the server and the mobile device. The server provides the map data and parking zone information as part of a web service. Such systems are designed for commercial parking situations. As such, the parking zones are predefined and generally comprise uniformly shaped spaces that are well-marked (e.g., with painted boundaries) so as to make the parking zones easily identifiable to the driver even without the aid of the map data. The server selects an unoccupied zone and identifies the selected zone to the software application. However, the selection of the unoccupied zone does not take into consideration rules and/or etiquette that apply to the parking zones. Additionally, vehicle-to-everything (V2X) equipment onboard the vehicle engages in one-way communication with a roadside unit (RSU) located in the parking area to convey the GPS location of the vehicle to the RSU. In turn, the RSU can communicate the GPS location of the vehicle to the remote server.

BRIEF SUMMARY

Methods, apparatuses, and computer-readable media are disclosed for intelligently defining parking zones within a parking area and efficiently communicating information about the parking zones to a vehicle to be parked in the parking area. The information communicated can include information indicating where the zones are located, information indicating which zones are valid spaces to park in, rules indicating conditions for determining whether a zone is valid, and the like. The embodiments described herein are applicable to vehicles equipped with self-parking functionality (e.g., a fully autonomous or semi-autonomous vehicle) as well as vehicles that are manually parked. Although described in connection with motor vehicles, the example embodiments are applicable to any type of vehicle, including land vehicles (e.g., cars, motorcycles, trucks) and flying vehicles (e.g., airplanes, helicopters).

In certain embodiments, a computer system onboard a vehicle engages in two-way communication with a parking assistant device in a parking area to communicate vehicle location information to the parking assistant device and to receive parking area information from the parking assistant device. The two-way communication may involve messages in a standard V2X (vehicle-to-everything) format for sending vehicle location information from the vehicle to the parking assistant device and custom-format V2X messages for sending parking area information from the parking assistant device to the vehicle. Alternatively, the two-way communication may involve custom-format messages in both directions. For example, the vehicle may send a custom-format message with vehicle location information and receive a custom-format message with parking area information. As another example, the vehicle may send a standard-format message (e.g., a Cooperative Awareness Message (CAM) or Basic Safety Message (BSM)) with vehicle location information, receive a custom-format message with parking area information, and send a custom-format message with additional information for the parking assistant device after receiving the message containing the parking area information.

In certain embodiments, the parking area information communicated to a vehicle comprises information indicating a valid parking zone and/or rules regarding which parking zones are valid. A parking zone can be one of multiple zones (e.g., multiple parking spots) within a parking area that can be potentially occupied by a parked vehicle. Valid parking zones can be user defined (e.g., by a user associated with the parking area). Additionally, in certain embodiments, valid parking zones and/or rules regarding valid parking zones are automatically defined by learning over time what zones are valid and/or preferred. The rules can be stored locally within the parking assistant device or on a remote computer that transmits the rules to the parking assistant device over a communications network such as the Internet.

In certain embodiments, a parking assistant device monitors a status of a parking area. The monitoring can include determining which parking zones are currently occupied. Based on the monitoring, status messages may be communicated to a computer device of a user associated with the parking area (e.g., the same user who configures the parking zones). For example, if a vehicle parks in an invalid zone, the system may send a message (via email, text message, a push notification, etc.) to a computer device of the user to alert the user that an unauthorized parking event has been detected.

In certain embodiments, a method performed by a vehicle system of a vehicle includes transmitting, from the vehicle system to a computer device associated with a parking area, one or more messages indicating a location of the vehicle. The method further includes receiving, by the vehicle system, one or more response messages from the computer device. The one or more response messages include information about the parking area. The information about the parking area includes a rule for determining whether the vehicle is permitted to park in an unoccupied parking zone within the parking area or indicates a result of applying the rule. The method further includes decoding, by the vehicle system, the one or more response messages to extract the information; and processing, by the vehicle system, the information in connection with a parking operation. The processing comprises: (1) presenting the information on an audio or visual output device of the vehicle, the information being presented prior to performance of the parking operation, during performance of the parking operation, or both, or (2) determining, using the information, an autonomous driving maneuver performed as part of the parking operation.

In certain embodiments, a method performed by a computer device associated with a parking area includes receiving, by the computer device, one or more messages from a vehicle system of a vehicle, the one or more messages indicating a location of the vehicle. The method further includes tracking, by the computer device, a movement of the vehicle based on the one or more messages; and generating, by the computer device, one or more response messages. The one or more response messages include information about the parking area. The information about the parking area includes a rule for determining whether the vehicle is permitted to park in an unoccupied parking zone within the parking area or indicates a result of applying the rule.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Certain embodiments are described in connection with a parking environment for motor vehicles. However, as indicated above, the embodiments described herein are applicable to any type of vehicle. Additionally, the example embodiments are described with respect to non-commercial parking scenarios (e.g., a private parking lot or home parking garage), but are also applicable to commercial parking scenarios. The embodiments have uses beyond "park-and-leave" situations. For example, the embodiments can be used in places such as a drive-through restaurant, a car wash, or a vehicle repair shop, for example, to communicate to vehicles a preferred location to park in.

While cameras and other sensors allow vehicles to detect parking zones or parkable spaces, they are not capable of detecting rules and/or etiquette that apply to those spaces beyond observing visible signage or by making other basic assumptions. A decision on whether to park in a particular space should not be based solely on whether the space is currently unoccupied. This problem applies not only to autonomous driving, but also non-autonomous vehicles. Both driving situations may benefit from vehicles receiving information about appropriate parking spaces.

Figure 1:
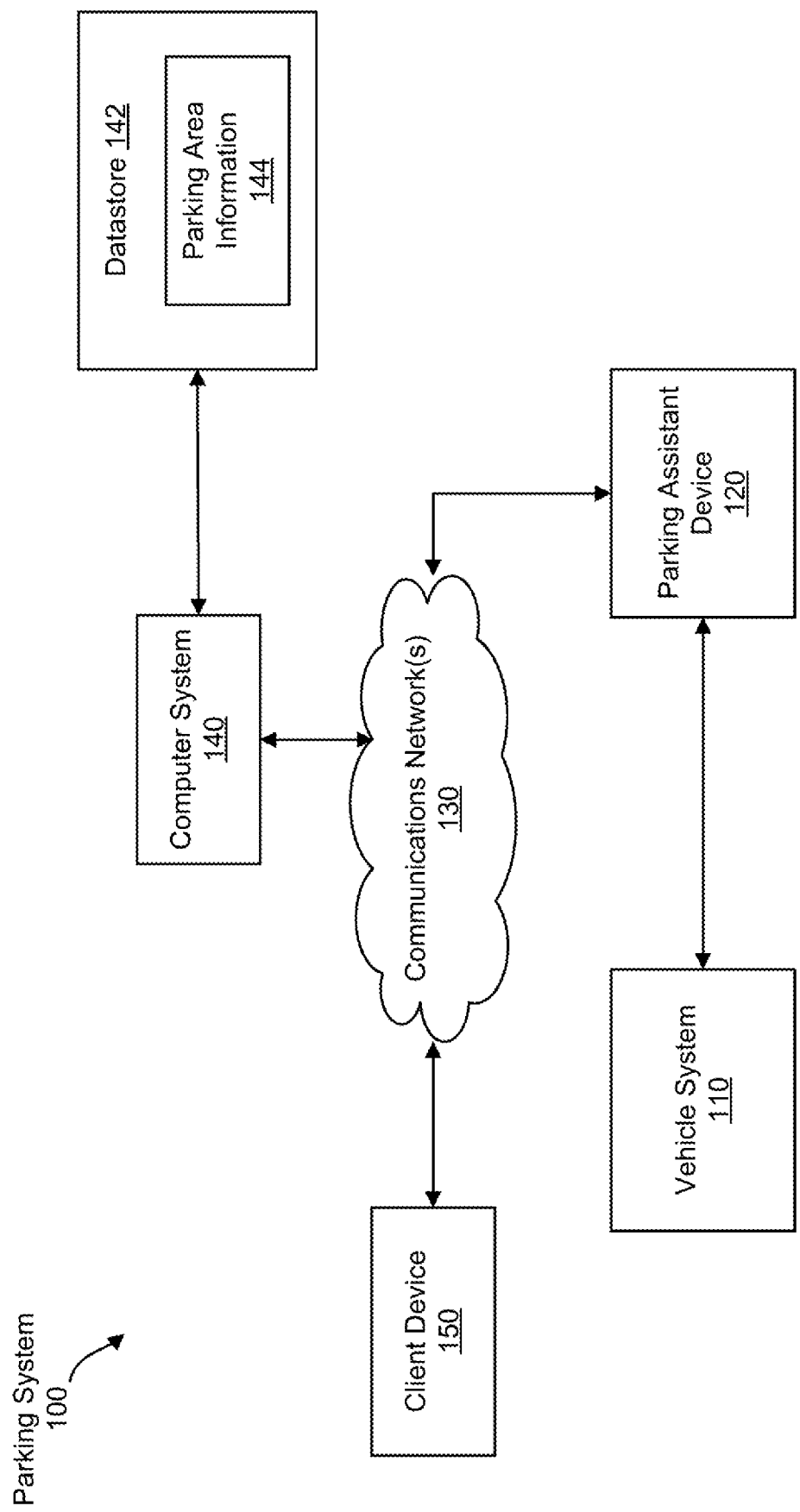
FIG. 1 illustrates a parking system in accordance with certain embodiments.

FIG. 1 illustrates a parking system 100 in accordance with certain embodiments. The parking system 100 includes a vehicle system 110 onboard a vehicle and a parking assistant device 120 communicatively coupled to the vehicle system 110. Parking system 100 further includes a computer system 140 communicatively coupled to the parking assistant device 120 and to a client device 150 via one or more communications network 130.

Client device 150 is a computer device operated by a user who configures parking area information 144 maintained in a datastore 142. In the embodiment depicted in FIG. 1, the computer system 140 has access to the datastore 142, which can be local to or remote from the computer system 140. For example, datastore 142 can be provided on a computer-readable storage medium in the computer system 140, such as a hard drive, random access memory (RAM), a memory card, and the like. Alternatively, datastore 142 could be hosted on a cloud drive or some other networked storage device. In some embodiments, datastore 142 may be maintained locally within the parking assistant device 120 and/or client device 150. Further, the information contained in the datastore 142 can be stored in a distributed fashion by different computer devices or systems depicted in FIG. 1. For instance, computer system 140 may be responsible for maintaining a master copy of the parking area information 144 and distributing at least some of the parking area information 144 to client device 150 and/or parking assistant device 120 for local storage.

Figure 2:
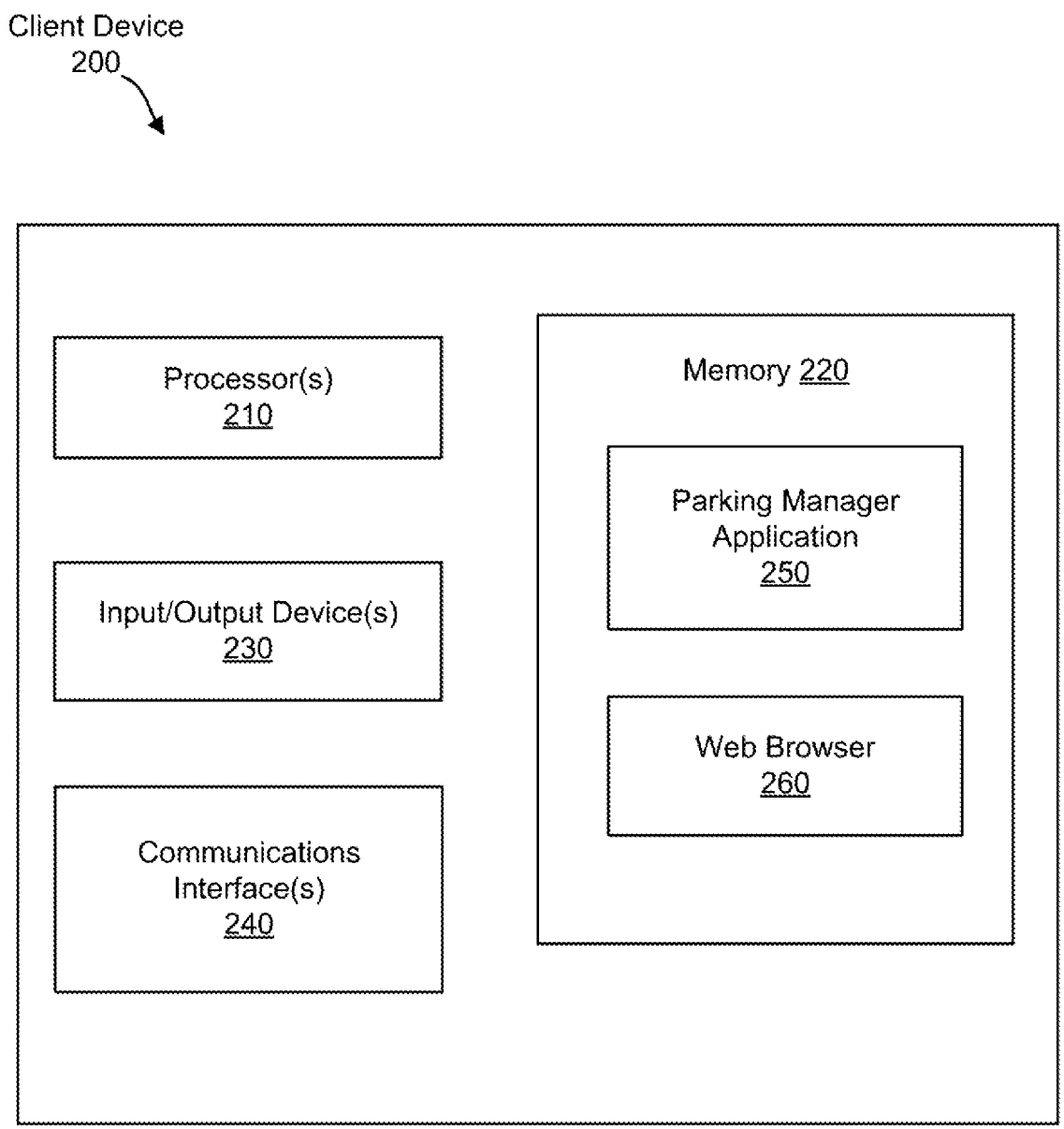
FIG. 2 illustrates a client device according to certain embodiments.

Client device 150 can be a mobile device (e.g., a smartphone, laptop, or tablet), a desktop computer, or other computer device configured to receive user input and communicate with computer system 140. An example of a client device is shown in FIG. 2. Client device 150 can be operated by a user who is a driver or owner of a vehicle in which the vehicle system 110 is deployed, or some other user in charge of managing a parking area. The user operates client device 150 to configure the parking area information 144 for the parking area. Client device 150 may be configured to provide a user interface (e.g., via a software application or web site) that enables the user to configure the parking area information 144 in a user-friendly manner. The configuration may involve defining the parking area and/or individual parking zones within the parking area. Additionally, the configuration may involve customizing one or more rules for determining whether a particular zone is valid or not. Such rules can be stored as part of the parking area information 144. A rule can include one or more conditions regarding validity. The conditions can include time-based conditions (e.g., time of day or day of week, or specific dates), non-time-based conditions (e.g., maximum vehicle size, identities of drivers who are authorized to park in the parking area or a particular parking zone, or a list of vehicles authorized to park in the parking area or a particular parking zone), or a combination of time-based and non-time-based conditions.

Parking assistant device 120 is a computer device that is typically physically located within the parking area to which the parking area information 144 pertains. However, the parking assistant device 120 can be located anywhere in the vicinity of the parking area so long as the parking assistant device 120 can communicate with vehicles that approach or enter the parking area. For example, the parking area could be a homeowner's garage and the parking assistant device 120 could be located in the homeowner's living room or front yard.

Parking assistant device 120 is configured to obtain the parking area information 144, determine based on the rules which zones are valid spaces to park in, and communicate parking area information (e.g., information identifying one or more zones or rules relating to the one or more zones) to the vehicle system 110. The parking area information 144 can be sent to the parking assistant device 120 during an initial configuration of the parking area information 144 and thereafter sent from the computer system 140 whenever the parking area information 144 is updated. The parking assistant device 120 can maintain a local copy of the parking area information 144 so as to avoid having to obtain the parking area information 144 from the computer system 140 every time the parking assistant device 120 communicates with a vehicle system.

The information communicated to the vehicle system 110 can include, for example, a location (e.g., one or more GPS coordinates) of a valid parking zone selected by the parking assistant device 120 and/or an indication of the size or shape of a parking zone (e.g., the coordinates of two or more corners, the length and width of the zone, an image of the zone, and the like). In some embodiments, the parking assistant device 120 may communicate a rule to the vehicle system 110 in order to enable the vehicle system 110 to determine whether a particular zone is valid or not. Alternatively, the parking assistant device 120 may simply indicate to the vehicle system 110 that a particular zone is valid or invalid after applying the rule.

As indicated above, the parking area information 144 can be user configured. Additionally, in certain embodiments, at least some of the parking area information 144 may be generated based on machine learning performed by the parking assistant device 120 or some other computer device or system (e.g., computer system 140) with access to information on vehicle activity within the parking area. For example, the user of the client device 150 may perform an initial setup of the parking area information 144 by specifying where the parking area is located and identifying a space within the parking area as a parking zone. Over time, the parking assistant device 120 or other device/system with access to vehicle activity can observe where vehicles tend to park and, based on these observations, modify the zones and/or rules concerning the zones. For instance, new zones can be created, less frequently used zones deleted, and rules defined for determining whether zones are valid or not.

In addition to communicating with the vehicle system 110, the parking assistant device 120 may be configured to communicate information about the parking area to the client device 150. For example, parking assistant device 120 can monitor the parking area and send status updates to inform the client device 150 about vehicles entering, leaving, or parking in the parking area. Such updates can be sent upon request from the client device 150 or in automated response to certain vehicle activities (e.g., unauthorized parking events). For instance, the user may configure an alert so that a message is sent to the client device 150 whenever a vehicle enters the driveway of the parking area or parks in an invalid zone. The updates can include a list of all vehicles in the parking area, the locations of such vehicles, times of arrival or departure for each vehicle, and other vehicle related information. In some embodiments, the parking assistant device 120 may be part of a home security system and will report suspicious vehicle activity to a computer system operated by local law enforcement or a private security provider.

In some embodiments, the parking area information 144 is validated, e.g., by the parking assistant device 120 or the computer system 140. Validation can be performed, for instance, whenever the parking area information 144 is updated (e.g., through manual configuration or automated learning). Validation may involve processing to determine whether the defined parking zones are confined to the parking area (e.g., a check to make sure the boundaries of a parking zone are within the boundaries of the parking area). Other types of validation can also be performed. For example, the parking assistant device 120 could receive, either directly or via the computer system 140, a message from a second parking assistant device (e.g., a parking assistant device associated with a neighbor's home) indicating that a parking zone associated with a parking area being monitored by the second parking assistant device overlaps with a parking zone indicated in the parking area information 144. A result of a validation procedure performed on the parking area information 144 can be communicated to the user of the client device 150 and/or an entity associated with the computer system 140.

Vehicle system 110 includes a computer system onboard a vehicle. Vehicle system 110 communicates with the parking assistant device 120 wirelessly. For example, vehicle system 110 may include a vehicle-to-everything (V2X) communications interface comprising a wireless transceiver configured to broadcast messages to nearby V2X-enabled devices (e.g., parking assistant device 120) and further configured to receive messages from the nearby V2X-enabled devices. Although FIG. 1 depicts a single vehicle system 110, the parking assistant device 120 can communicate with any vehicle system that is within transmission range and operating on the same wireless communications protocol. Therefore, vehicle system 110 is representative of a vehicle system of one or more vehicles that visit the parking area. Communications between vehicle system 110 and parking assistant device 120 may involve the vehicle system 110 broadcasting a message indicating vehicle location and other vehicle information. When the vehicle system 110 is within range, the parking assistant device 120 will receive the message and respond with a message containing parking area information (e.g., information about zone location, zone validity, rules, etc.).

In certain embodiments, parking assistant device 120 is configured to selectively respond to messages received from a vehicle system. For instance, to avoid sending parking area information to vehicles that are driving by the parking area with no intention of parking or stopping, the parking assistant device 120 may be configured to respond only when the vehicle is in the vicinity of parking area and/or remains for a certain period of time (e.g., within a threshold distance of the parking area for at least a threshold duration). In some embodiments, parking assistant device 120 may, as part of monitoring the status of the parking area, track the movement of vehicles based on the messages received from the respective vehicle systems 110 of the vehicles. Upon determining that a vehicle is likely to attempt parking in the parking area, the parking assistant device 120 will send a response message containing parking area information. Such a determination can be based on a combination of factors. For instance, parking assistant device 120 may respond only when the vehicle is within the threshold distance, traveling below a certain speed, and headed toward a parking zone.

Vehicle system 110 may include components that control one or more components within a vehicle. For instance, vehicle system 110 can include a display device that displays information received from the parking assistant device 120 to a vehicle occupant such as the driver of the vehicle. In some embodiments, vehicle system 110 includes a control unit or autonomous agent (e.g., a processor executing autonomous driving software) configured to autonomously execute one or more vehicle operations without driver input. For instance, vehicle system 110 may self-park the vehicle taking into consideration the parking area information received from the parking assistant device 120. If the parking area information indicates a particular zone in which to park, the vehicle system 110 may initiate self-parking to maneuver the vehicle into the indicated zone. The vehicle system 110 may treat the parking area information as a recommendation that does not override safety considerations or other factors that the vehicle system 110 is configured to recognize as being of higher priority than the parking area information. For instance, if the vehicle system 110 detects a pedestrian or obstacle within the indicated zone, the vehicle system 110 may abort a parking operation or choose another space to park in.

In some instances, the vehicle system 110 outputs the parking area information received from the parking assistant device 120 to a driver of the vehicle to enable the driver to decide how to proceed with regard to parking. For example in a non-autonomous vehicle, the vehicle system 110 may output a graphical representation of the parking area on a console display or overhead display. The parking area information can be output over any human machine interface and can include audio output in addition, or as an alternative, to visual output. For instance, the vehicle system 110 can emit a series of beeps over a loudspeaker, where the beeps become more frequent as the vehicle becomes closer to an indicated zone. The driver or other vehicle occupant can be provided with parking area information even if the vehicle is equipped with self-parking or autonomous driving capabilities.

Communications network 130 includes one or more wired and/or wireless networks through which data is sent between the client device 150, the computer system 140, and the parking assistant device 120. In some embodiments, communications network 130 includes a cellular (e.g., 4G or 5G) network. For example, in one implementation, the client device 150 connects to a website hosted by the computer system 140 via the cellular network in order to configure the parking area information 144. Alternatively, the cellular network may connect a software application executing on the client device 150 to the computer system 140 via an application program interface. Communications network 130 can also include a local network (e.g., a WiFi network in the user's home) that connects the parking assistant device 120 to the Internet, thereby enabling the parking assistant device 120 to receive the parking area information 144 from the computer system 140. Messages from the parking assistant device 120 to the client device 150 (e.g., alerts relating to vehicle activity) can be sent by the computer system 140 on behalf of the parking assistant device 120. Alternatively, in some embodiments, client device 150 may communicate with parking assistant device 120 through the communications network 130 and without going through computer system 140.

FIG. 2 is a simplified block diagram of a client device 200 according to certain embodiments. The client device 200 can implement client device 150 in FIG. 1 and includes one or more processors 210, memory 220, at least one input/output (I/O) device 230, and one or more communications interfaces 240.

Processor 210 can include a central processing unit, microprocessor, or other computer hardware configured to execute instructions contained in the memory 220. The instructions in memory 220 include instructions of a parking manager application 250. Memory 220 may also store a web browser executable on the processor 210. Parking manager application 250 can be a mobile application or desktop software specifically provided for configuration of parking area information. Parking manager application 250 may provide an interactive user interface by which a graphical representation of a parking area is displayed to the user of client device 200, and by which the user can manually configure one or more parameters relating to the parking area. For instance, the parking manager application 250 can permit the user to specify a particular geographic location as a parking area and to define one or more parking zones within the parking area. The parking manager application 250 can further permit the user to create one or more rules for the parking area, e.g., by specifying times during which a particular zone is invalid.

The functionality provided by the parking manager application 250 can also be provided through the web browser 260. For instance, in certain embodiments, the user may execute the web browser to access a website or web portal through which an application executing on the computer system 140 generates a user interface for display within the web browser 260. In some embodiments, the computer system 140 may store the parking area information 144 in association with a user profile created for the user of client device 200. Parking manager application 250 and/or web browser 260 can be used to log into the computer system 140 and access the user profile so that the parking area information can be retrieved and/or modified. A user profile can include information for more than one parking area. For instance, the user may create a first set of parking area information for a garage area inside the user's house and a second set of parking area information for a driveway outside the user's house.

I/O devices 230 can include a display device configured to present the user interface generated using the parking manager application 250 and/or web browser 260. I/O devices 230 can further include input devices for interacting with the user interface, such as a keyboard, mouse, touchscreen, touchpad, etc. In general, I/O device 230 can be any device capable of receiving user input and providing output to the user.

Communications interface 240 includes one or more interfaces to a communications network. For example, communications interface 240 may include a wired network access card or wireless transceiver for connecting to the parking assistant device 120 and/or the computer system 140.

Figure 3:
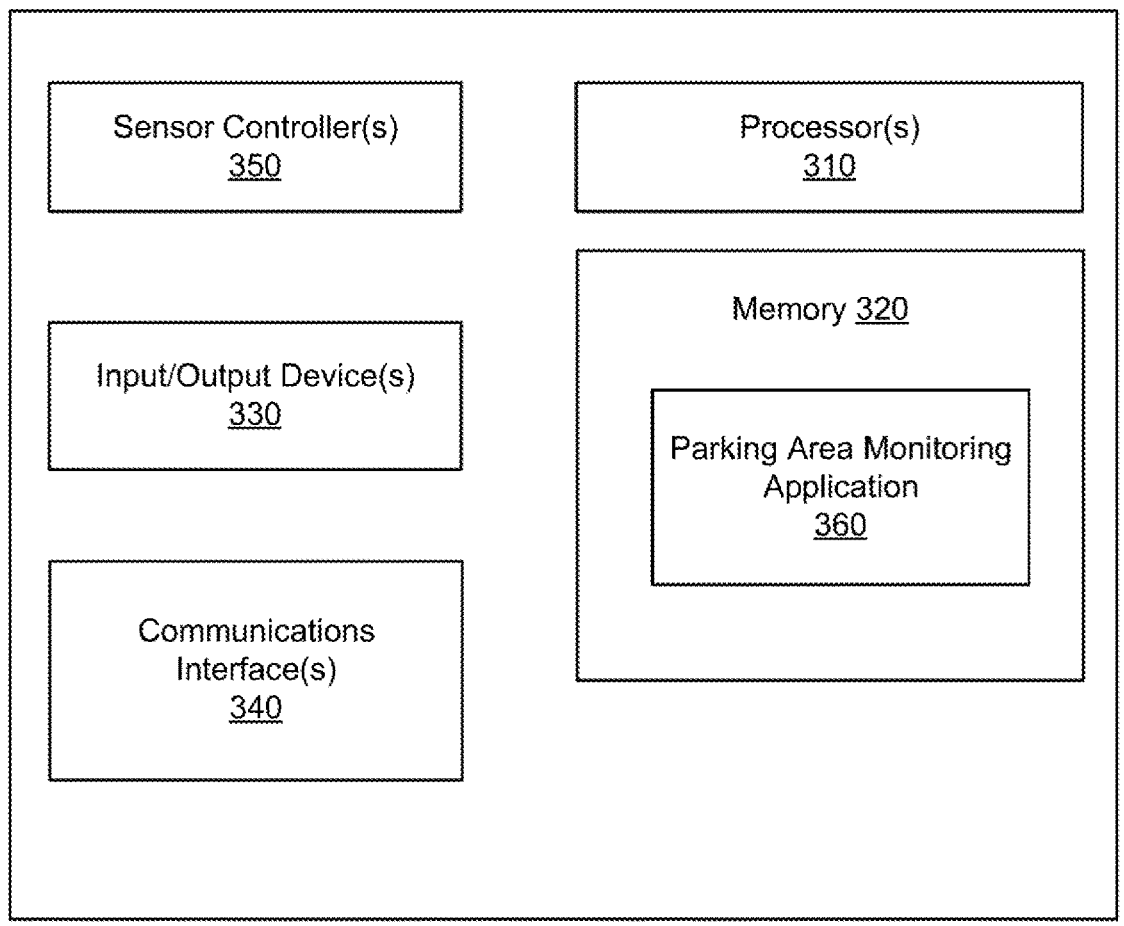
FIG. 3 illustrates a parking assistant device according to certain embodiments.

FIG. 3 is a simplified block diagram of a parking assistant device 300 according to certain embodiments. The parking assistant device 300 can implement parking assistant device 120 in FIG. 1 and includes one or more processors 310, memory 320, at least one I/O device 330, and one or more communications interfaces 340.

Processor 310 can include a central processing unit, microprocessor, or other computer hardware configured to execute instructions contained in the memory 320. The memory 320 can store a parking area monitoring application 360. Parking area monitoring application 360 may include program code that, when executed by the processor 310, causes the processor 310 to listen for messages from vehicle systems and respond with messages communicating parking area information. The program code may also provide for updating of the status of a parking area based on messages from vehicle systems. For example, parking assistant device 300 can track the location and movement of any vehicle that sends a message to the parking assistant device 300.

Communications interface 340 includes one or more interfaces to a communications network. For example, in certain embodiments, the communications interface 340 includes a V2X transceiver that listens for V2X messages broadcast by vehicle systems. The V2X transceiver can be operated in a low power or sleep mode until a message is received. Upon receiving such a message, the V2X transceiver can exit the low power or sleep mode to listen for vehicle messages at a faster rate. The message is processed by the processor 310 executing the parking area monitoring application 360 to determine whether to respond to the vehicle system that sent the message and, if so, what the contents of the response message should be. For example, as indicated earlier, the parking assistant device 300 can respond only to vehicles that are likely to attempt parking within the parking area. The response message can be sent via the V2x transceiver and, in certain embodiments, is a broadcast message that can be received by any nearby V2X-enabled vehicle. However, in order to process the parking area information contained in the response message, the vehicle should be configured to understand the format of the response message.

Communications interface 340 may include a network communications interface that provides connectivity to one or more communications networks that couple the parking assistant device 120 to the computer system 140 and/or the client device 150. For example, communications interface 340 can include a wired or wireless network card that connects the parking assistant device 300 to the Internet via a local network. In some embodiments, the communications interface 340 may communicate over the Internet by connecting to a WiFi router or wireless access point located in the vicinity of a parking area being monitored by the parking assistant device 300.

I/O device 330 can include a display, light-emitting diodes, or other devices that provide visual output. I/O device 330 can also include a loudspeaker and a device that receives user input. Since the parking assistant device 300 does not need to display a map of the parking area, a display of the parking assistant device 300 can be implemented in a simpler fashion compared to the display of a client device or vehicle system. For instance, a display of the parking assistant device 300 may only be used to provide status information about the parking assistant device (e.g., whether the parking assistant device is currently connected to the Internet, whether monitoring has been engaged, and the like). Likewise, the parking assistant device 300 does not require a significant amount of direct user input, but can include a touchpad or other input device for connecting to a communications network (e.g., based on user input of a WiFi password).

In some embodiments, parking assistant device 300 includes one or more sensor controllers 350 configured to direct the operation of at least one sensor in or around the parking area. Sensors that may be controlled by the parking assistant device 300 include cameras, microphones, proximity sensors, motion sensors, and the like. The information collected by such sensors could be used to supplement the information contained in vehicle messages, thereby providing a more detailed view of the parking area and the status of any vehicles in the parking area.

Figure 4:
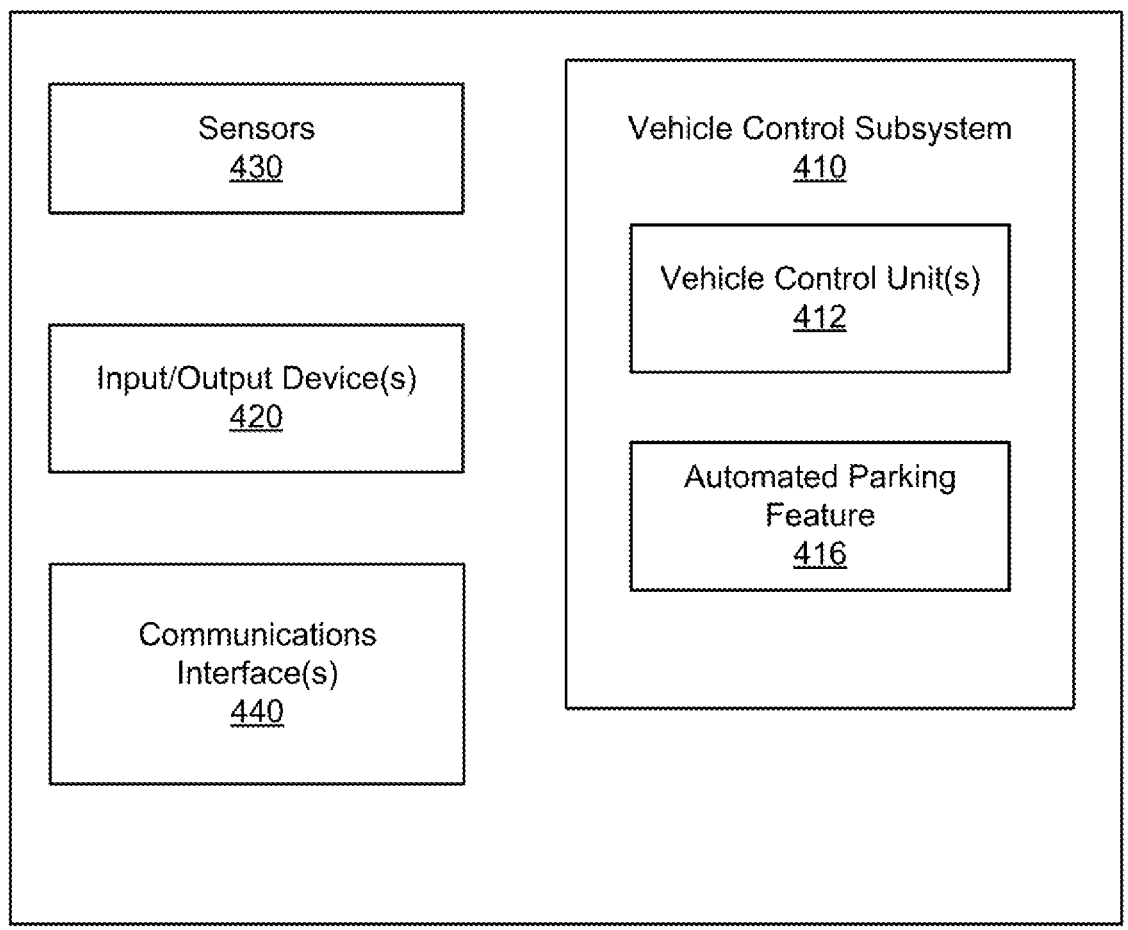
FIG. 4 illustrates a vehicle system according to certain embodiments.

FIG. 4 is a simplified block diagram of a vehicle system 400 according to certain embodiments. The vehicle system 400 can implement vehicle system 110 in FIG. 1 and includes a vehicle control subsystem 410, one or more I/O devices 420, one or more sensors 430, and one or more communications interfaces 440.

Vehicle control subsystem 410 comprises a computer system that includes one or more vehicle control units 412 (e.g., electronic control units or ECUs). The vehicle control units 412 may include any number of embedded systems that each control one or more electrical systems or other subsystems of a vehicle. Examples of vehicle control units 412 include, without limitation, an engine control unit, a power steering control unit, a powertrain control module, a speed control unit, a telematics control unit, a transmission control unit, and/or a brake control module.

In some embodiments, vehicle control units 412 may comprise one or more processors and one or more non-transitory computer-readable media storing processor-executable instructions. For instance, a vehicle control unit 412 may include a processor configured to execute a software application that processes V2X messages received from a parking assistant device to determine an autonomous driving operation (e.g., self-parking) or to generate output for a vehicle occupant via an I/O device 420.

Sensors 430 may comprise any number of devices that provide information about the vehicle in which vehicle system 400 is deployed and/or an environment external to the vehicle. Examples of sensors 430 include, without limitation, a camera, a microphone, a radar sensor, an ultrasonic sensor, a LIDAR sensor, a global positioning system (GPS) sensor, a steering angle sensor, and/or a motion sensor (e.g., an accelerometer and/or gyroscope). In particular, vehicle system 400 may be equipped with a GPS sensor or other position locating sensor that can determine the location of the vehicle in order to include the vehicle's location as part of message receivable by a parking assistant device.

In some embodiments, vehicle control subsystem 410 includes an automated parking feature 416. The automated parking feature 416 may comprise hardware (e.g., an actuator) and/or software that enables autonomous performance of parallel, perpendicular, and/or angle parking. In some embodiments, automated parking feature 416 may comprise a set of instructions that coordinate between one or more vehicle control units 412 (e.g., a power steering control unit and/or a powertrain control module) and one or more sensors 430 (e.g., a camera, a radar sensor, an ultrasonic sensor, and/or a LIDAR sensor) during execution of a parking maneuver.

I/O device 420 can include a display that presents a graphical representation of a parking area to a vehicle occupant. For instance, the display can present a map of the parking area and an indication of the size, shape, or location of one or more zones in the parking area. The specificity with which a zone is indicated can vary and, in some embodiments, is configurable by the vehicle occupant. For instance, the display could provide a general indication of the location of a zone in which to park (e.g., an arrow showing a direction in which to drive). Alternatively, the display could highlight the boundaries of a particular zone within the map of the parking area. The display can be placed in any suitable area of the vehicle within view of one or more occupants (e.g., integrated into the driver console or on an overhead display device). In some embodiments, the vehicle system 400 includes multiple displays in different locations, e.g., to simultaneously display the map of the parking area to multiple occupants.

I/O devices 420 can also include audio output devices, haptic output devices, and/or other devices that can be operated to generate output for a vehicle occupant in connection with a parking operation. For instance, audio instructions directing the driver to a selected zone can be output over a loudspeaker. In some embodiments, text and/or audio messages are presented to a vehicle occupant to provide the occupant with information about a zone (e.g., a rule indicating a parking restriction for a particular zone).

Communications interface 440 includes a wireless communications interface configured to send messages to, and receive messages from, a parking assistant device. As indicated above vehicle messages can be transmitted as V2X formatted messages. However, other wireless communications protocols can be supported. In a GPS equipped vehicle, communications interface 440 may further include a transceiver configured to communicate with one or more components of a global positioning system (e.g., a satellite or a local assistance server).

The embodiments illustrated in FIGS. 1-4 are merely examples. One of ordinary skill in the art would recognize various modifications are possible. For example, in certain embodiments, one or more components may be combined and functionality provided in software can be implemented in hardware or a combination of software and hardware.

Figure 5:
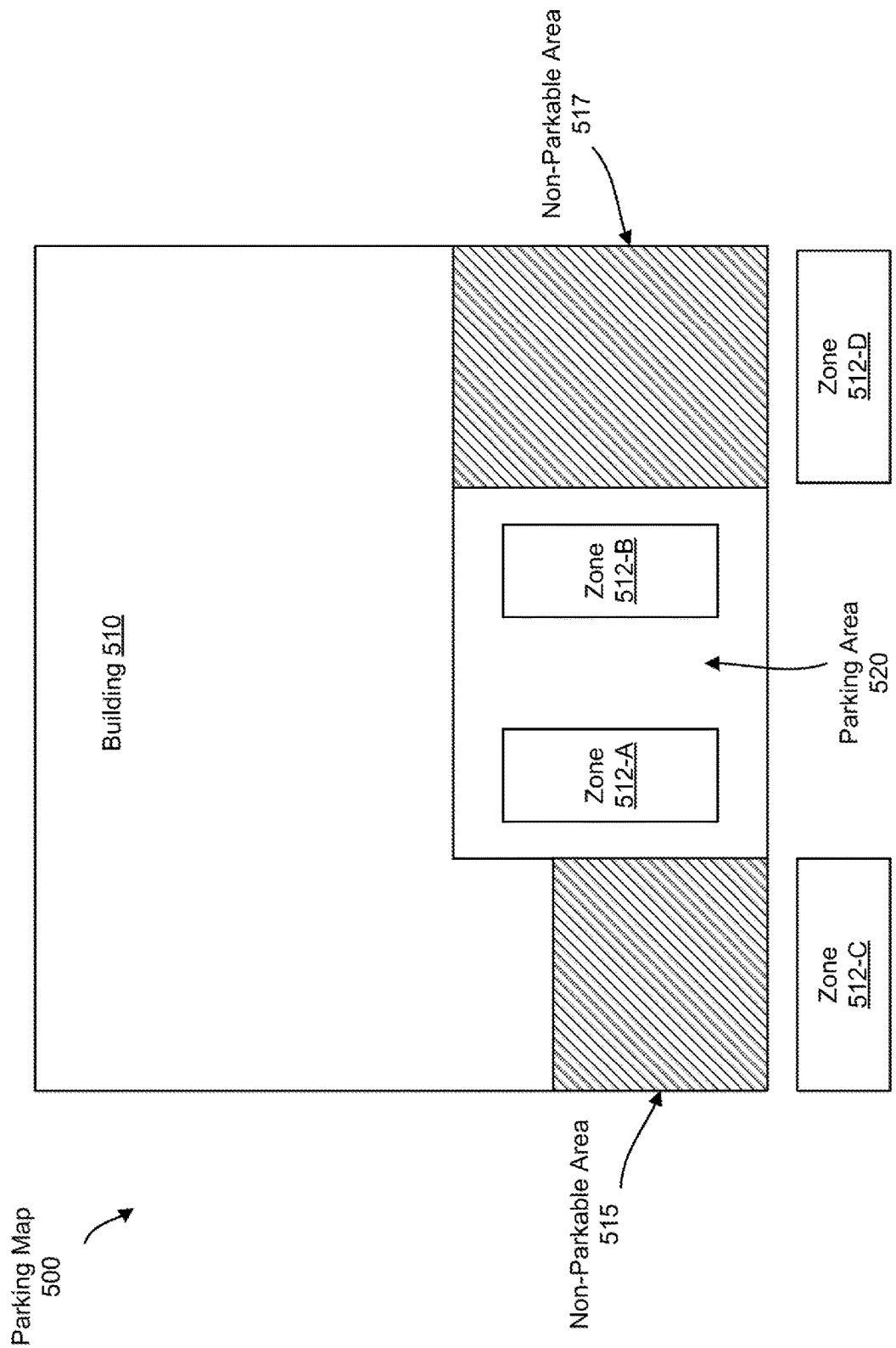
FIG. 5 illustrates an example parking map according to certain embodiments.

FIG. 5 illustrates an example parking map 500. In the embodiment depicted in FIG. 5, the parking map 500 is shown as a 2D representation of an area around a building 510. The parking map 500 can be stored as part of parking area information 144 in FIG. 1. Parking map 500 can be stored as a single file or multiple files, which contain one or more images, a set of coordinates, dimensions for one or more physical features, and the like. In addition to the building 510, the parking map 500 includes a parking area 520 and one or more non-parkable areas 515, 517. The parking map 500 further includes one or more parking zones (e.g., a parking zone 512-A and a parking zone 512-B) inside the parking area 520. As shown in FIG. 5, the parking map 500 can also include one or more parking zones outside the parking area 520. For instance, a parking zone 512-C and a parking zone 512-D may correspond to parking spaces on a public street and to either side of a driveway leading into the parking area 520. Although FIG. 5 shows the parking zones 512A-D as being the same size and shape, parking zones are not necessarily identical. For instance, parking zones can be defined which are non-rectangular and/or of different size.

Coordinates stored as part of or in association with the parking map 500 can be any type of coordinate that enables the real world location of the parking area 520 and the parking zones 512A-D to be identified. Based on user input indicating the location of the parking area 520, a user interface of a client device may display a map of a geographical area including the parking area 520. For instance, the user may input a street address of their house and be provided with an overhead view map of the user's house as a starting point for defining the parking map 500.

In certain embodiments, the coordinates are GPS coordinates and include, for example, a set of GPS coordinates (latitude and longitude) for the street address of the building 510 and/or a set of GPS coordinates for the parking area 520 (e.g., the center of the parking area 520 and/or the four corners of the parking area 520). Similarly, parking map 500 can include or be stored in association with GPS coordinates corresponding to each of the zones 512A-D. The information stored as part of or in association with the parking map 500 further permits the boundaries of the parking area 520 and the zones 512A-D to be identified. For instance, a rectangular parking area or parking zone can be identified based on GPS coordinates provided for each of the four corners, or based on a GPS coordinate provided for a single corner (e.g., upper left) plus length and width dimensions. Similarly, a circular parking area or zone can be identified based on a GPS coordinate for the center plus a radius.

Figure 6:
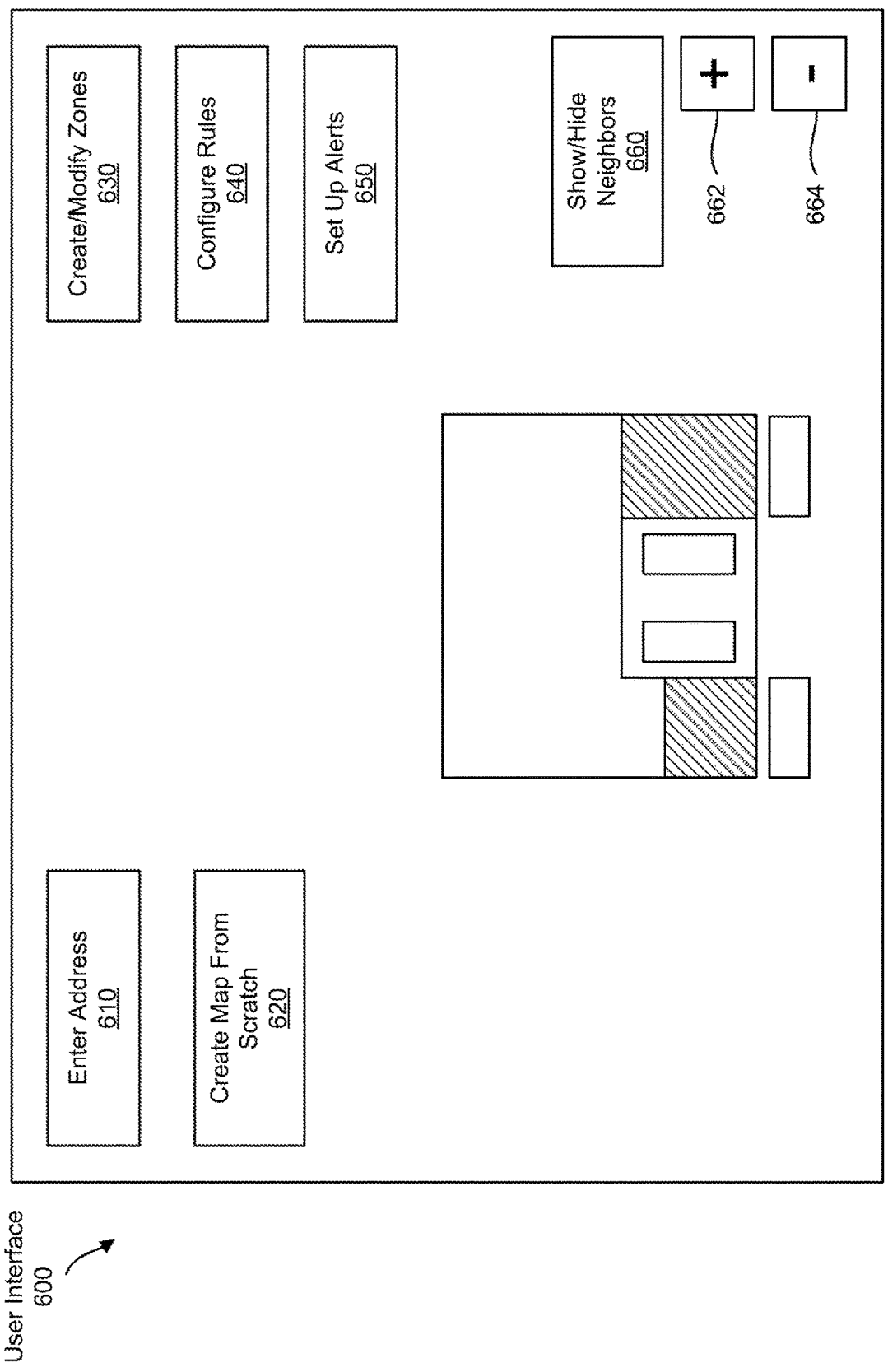
FIGS. 6-8 illustrate example user interfaces for configuring parking area information according to certain embodiments.

FIG. 6 illustrates an example of a user interface 600 usable for configuring parking area information 144 in FIG. 1. The user interface 600 can be provided by a software application executing on the client device 150. User interface 600 can include one or more user selectable options for defining a parking area and parking zones in the parking area. For example, user interface 600 can include an option 610 to input an address of a location associated with a parking area (e.g., the street address of the building 510 in FIG. 5). Upon user input of the address, the user interface 600 can be updated to display a graphical representation of the geographic location corresponding to the address. For instance, the software application on the client device 150 can retrieve a satellite image or map from a web based map service.

User interface 600 can include an option 620 to create a map from scratch. This would permit the user to define a parking area where no pre-existing image of the location associated with the parking area is available. For example, if the parking area is an indoor garage, the parking area can be manually drawn or specified.

User interface 600 can include an option 630 to create or modify parking zones for the parking area. For instance, the size and shape of the zones 512A-D can be manually configured using a menu displayed in response to selection of the option 630. The menu could include, for example, a drawing tool for manually drawing the boundary of a parking zone or a text field for inputting a GPS coordinate of a parking zone. The user does not necessarily have to provide a coordinate for each parking zone. For instance, once the boundaries of a parking zone have been defined, the coordinates of the parking zone can be estimated based on information provided for the parking area (e.g., GPS location, size and shape of parking area, and the like).

User interface 600 can include an option 640 to configure one or more rules that determine whether a zone is valid or not. As indicated earlier, a rule can include one or more conditions, where a condition can be time-based or non-time-based. For example, upon selection of the option 640, a calendar could be displayed to permit the user to select dates in which a particular zone is valid, a text field provided for user input of a maximum vehicle size for a particular zone, a text field provided for user input of times of day, and the like. In some embodiments, the user can manually select or otherwise indicate which zones are valid with respect to the representation displayed on user interface 600. For example, the user may highlight or click on a displayed zone to select the zone for association with a rule.

User interface 600 can include an option 650 to configure alerts regarding vehicle activity in the parking area. For example, in response to selection of option 650, a menu can be displayed with a list of alerts and options to subscribe to each alert. The list of alerts can include an alert for whenever a vehicle parks in an invalid zone or non-parkable area, an alert for whenever a vehicle enters the parking area during a certain time of day, and so on.

User interface 600 can also include one or more options for updating the representation displayed on the user interface 600. Such options include, for example, an option to show or hide neighboring properties (e.g., by limiting the display to a plot of land associated with a particular address), an option 662 to zoom into the display, and an option 664 to zoom out of the display.

Figure 7:
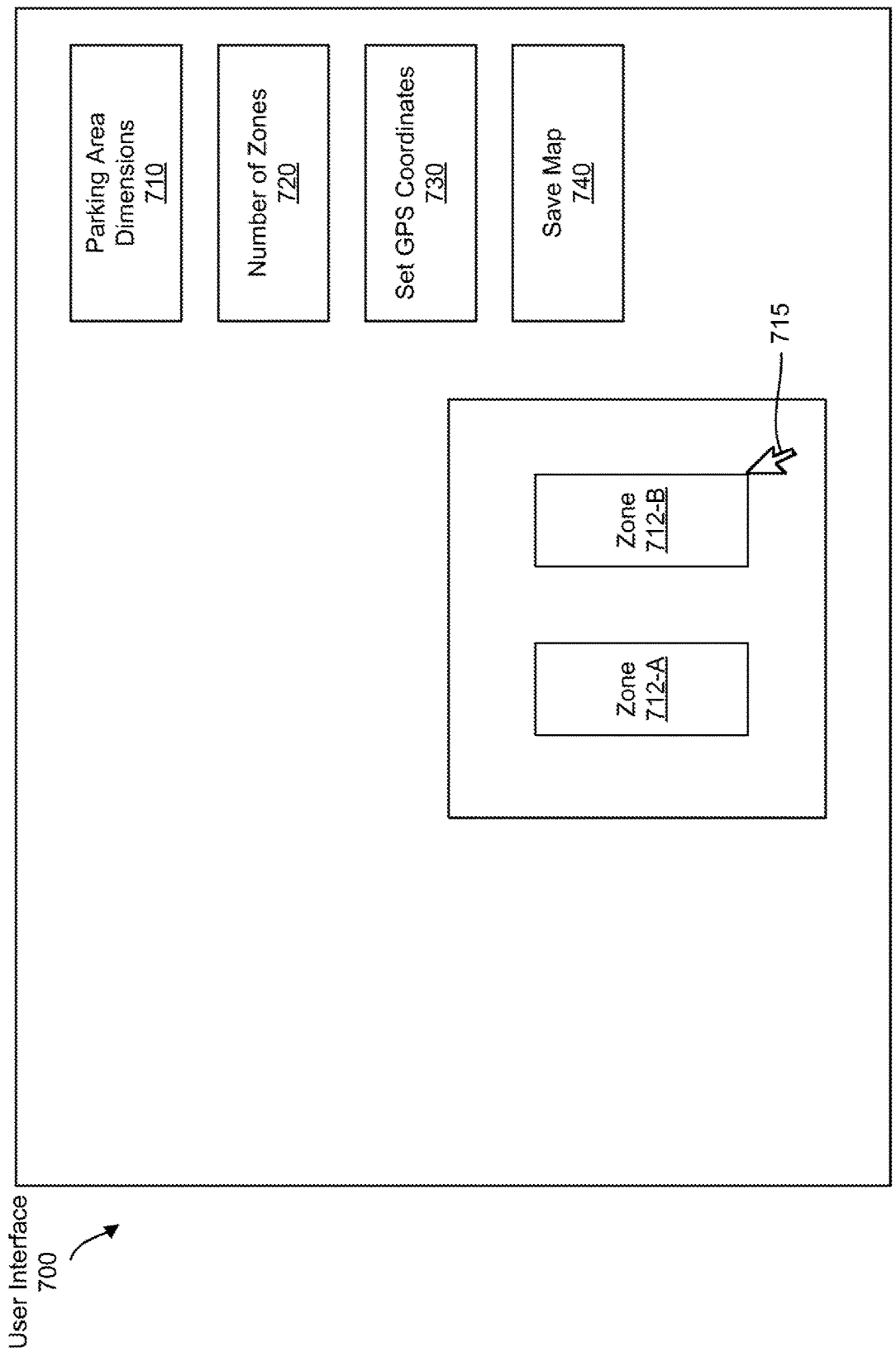

FIG. 7 illustrates an example of a user interface 700 usable for configuring parking area information 144 in FIG. 1. The user interface 700 includes options for providing details about a parking area and can be displayed in response to selection of the option 630 in FIG. 6. For example user interface 700 can include an option 710 to specify dimensions (e.g., length and width) of the parking area, an option 720 to specify the total number of parking zones in the parking area, and an option 730 to set GPS coordinates for the parking area or a zone within the parking area (e.g., one or more GPS coordinates for each of parking zones 712-A and 712-B). The user interface 700 can also display a screen cursor or other tool 715 for interacting with the user interface 700, e.g., for selection of an option or for drawing a parking zone.

In certain embodiments, GPS coordinates are set using a calibration process involving transmission of a vehicle message to a parking assistant device. For example, after creating a map of a parking area and defining a zone on the map, the user of a client device can park their vehicle in the defined zone and leave the vehicle running so that the GPS coordinates of the vehicle are sent to the parking assistant device. Alternatively, the GPS coordinates can be sent to the parking assistant device through the client device (e.g., via the parking manager application 250 and through the Internet) and captured using a GPS sensor of the client device while the client device is in the parked vehicle. Upon receiving the GPS coordinates, the parking assistant device can update the map or the information stored in association with the map such that the GPS coordinates are assigned to the defined zone. Calibration can be performed automatically as part of monitoring the parking area. Calibration can also be performed manually through a user interface of an application on the client device, e.g., through selection of the option 730 in user interface 700.

Figure 8:
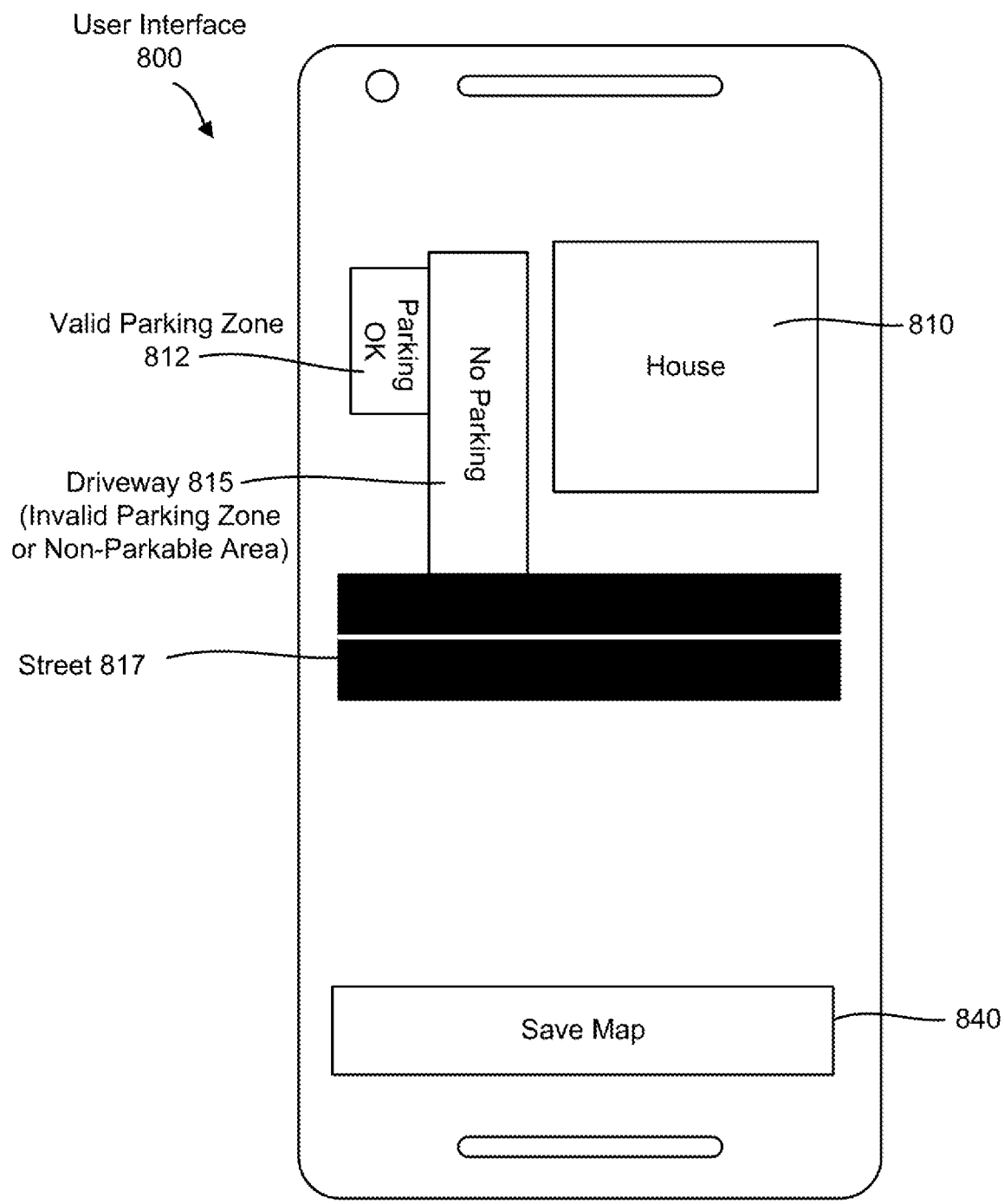

FIG. 8 illustrates an example of a user interface 800 displayed on a display screen of a mobile device that operates as the client device 150 of FIG. 1. The user interface 800 shows a representation of a map created for a parking area. The map displayed on the user interface 800 includes a graphical representation of a property associated with the parking area (e.g., a house 810), a graphical representation of a valid parking zone 812 displayed with a label "Parking OK", a graphical representation of an invalid parking zone or non-parkable area (e.g., a driveway 815) displayed with a label "No Parking", and a graphical representation of a street 817 adjacent to the driveway 815. The user interface 800 further includes an option 840 to save the map, similar to option 740 in FIG. 7.

Figure 9:
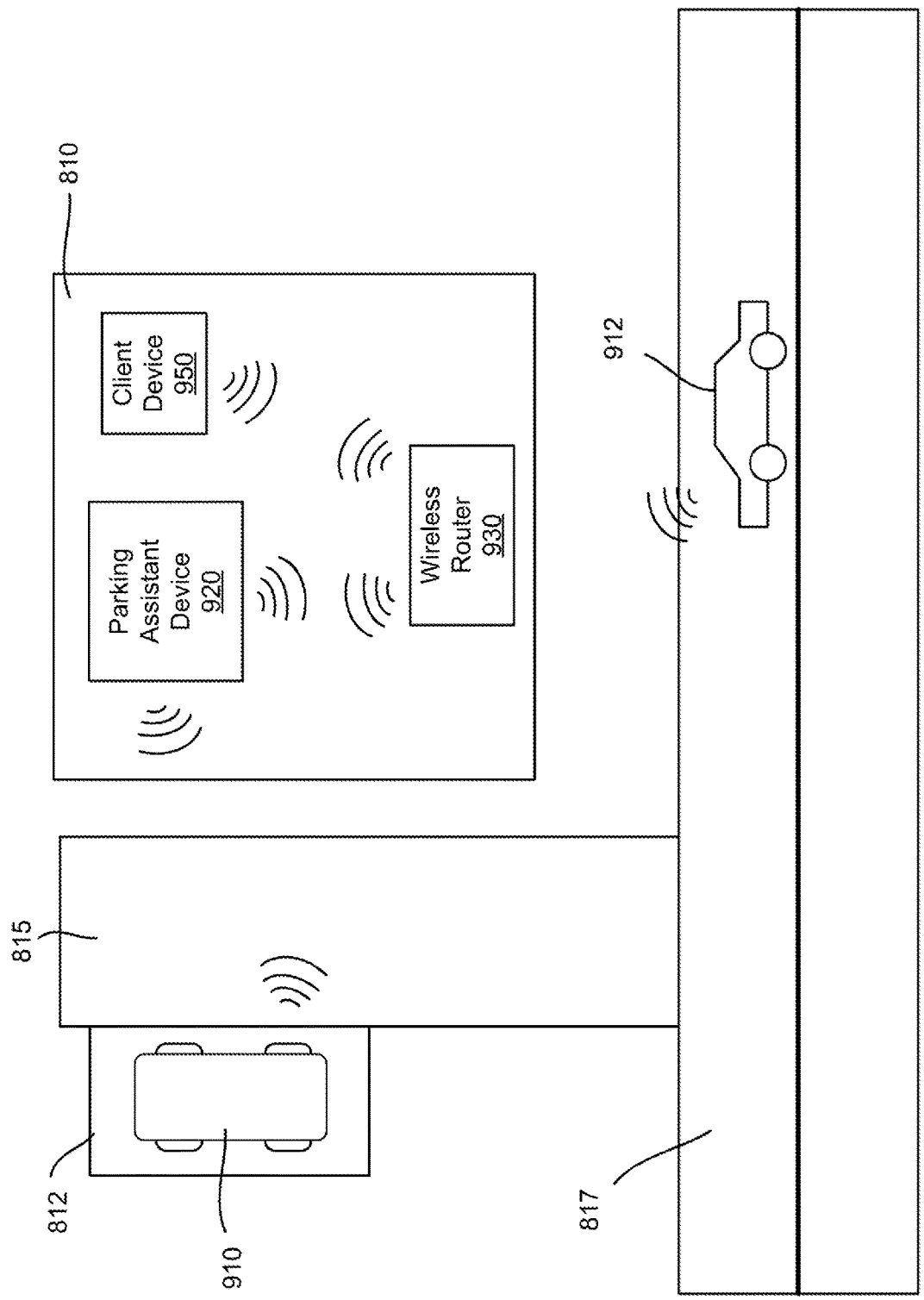
FIG. 9 illustrates an example parking scenario.

Example Parking Scenario (1): FIG. 9 illustrates an example parking scenario involving the parking area depicted in FIG. 8. In the example of FIG. 9, a first vehicle 910 and a second vehicle 912 are in wireless communication with a parking assistant device 920 deployed inside the house 810. As explained earlier, a parking assistant device can be configured to receive messages from vehicles that are within transmission range, and the vehicle messages can be V2X formatted messages. For example, the vehicle 910 could be configured to broadcast cellular vehicle-to-everything (c-V2X) messages (e.g., CAMs or BSMs) and the vehicle 912 could be configured to broadcast Dedicated Short Range Communications Messages (DSRCs).

In the scenario depicted in FIG. 9, the vehicle 912 is traveling along the street 817 while the vehicle 910 is parked in the zone 812. Vehicle 910 could be running and continuing to broadcast messages to the parking assistant device 920 when the first message from vehicle 912 is received by the parking assistant device 920. Alternatively, vehicle 910 could have stopped broadcasting messages sometime after the vehicle was parked and before the first message from vehicle 912 is received. In either case, the parking assistant device 920 is aware of the current location of the vehicle 910 based on the messages from the vehicle 910.

The parking assistant device 920 is further aware of the layout and status of the parking area. For instance, the parking assistant device 920 may recognize that the zone 812 is the only valid parking zone in the parking area, and that the zone 812 is currently occupied by vehicle 910 (e.g., based on receiving a V2X message from vehicle 910 containing a GPS coordinate corresponding to a GPS location of the zone 812). Since there are no zones that are valid and available for parking, the parking assistant device 920 may send a response message to the vehicle 912 indicating that there are no valid zones to park in. The response message may simply indicate that there are no available spaces. Alternatively, the response message could include more detail on why there are no available spaces. For instance, the response message could identify the location of zone 812 and also indicate that the zone 812 is currently occupied. The response message could also include one or more rules configured for zone 812 to enable the vehicle 912 to determine that the zone 812 would be a valid space to park in had the zone 812 not been occupied. Based on the response message, and provided that the vehicle 912 is capable of decoding the response message, the driver or autonomous agent of the vehicle 912 will receive information (e.g., a list of available parking zones, invalid or unavailable zones, rules, etc.) by which the driver or autonomous agent could determine an appropriate parking operation to perform. For instance, if the response message indicates that zone 812 is unavailable, the driver or autonomous agent can choose to park along the street 817 or at some other nearby location, and without blocking the driveway 815. In a scenario where there are multiple valid/available zones, the driver or autonomous agent can choose an appropriate zone to park in.

In the example of FIG. 9, the parking assistant device 920 is communicatively coupled to a client device 950 corresponding to client device 150 in FIG. 1. For instance, both the parking assistant device 920 and the client device 950 could communicate over a local WiFi network via a wireless router 930 inside the house 810. As another example, parking assistant device 920 may communicate with client device 950 over an Internet connection, possibly with a remote computer system (e.g., computer system 140 in FIG. 1) acting as an intermediary. Network connectivity can be provided in various ways. For instance, parking assistant device 920 may use the wireless router 930 to access the Internet while client device 950 uses a cellular connection to access the Internet. Additionally, although FIG. 9 depicts the parking assistant device 920 and the client device 950 as being inside the house 810, these devices can be located elsewhere. For instance, parking assistant device 920 could be somewhere outside the house 810 but within range of the wireless router 930, and client device 950 could be in some remote location so as not to be in communication with the wireless router 930. For example, client device 950 could be operated from a user's place of business or while the user is on vacation.

Example Parking Scenario (2): A driver of a non-autonomous vehicle enters a friend's single-vehicle driveway at 4:50 pm. A parking assistant device at the friend's home has been configured with a rule, or a has learned a rule, which provides that the driveway is only valid before 5:15 pm (e.g., because the friend's wife typically returns home from work at 5:15 pm and parks in the driveway). The parking assistant device sends one or more messages to the driver's vehicle indicating that the driveway is a zone that typically becomes occupied at 5:15 pm. The one or more messages from the parking assistant device further indicate an alternate parking location (e.g., a parking zone on the street adjacent to the driveway). In response to receiving the one or more messages from the parking assistant device, the vehicle system of the driver's vehicle generates an alert (e.g., audio and/or visual information presented through an output device of the driver's vehicle) indicating that there exists an alternate parking location. Based on the alert, the driver decides to park in the alternate parking location even though the driveway is unoccupied by any other vehicle.

Example Parking Scenario (3): An autonomous vehicle approaches the home of a friend of the owner of the autonomous vehicle. A parking assistant device at the friend's home sends one or more messages identifying multiple parking zones, each of which is valid and unoccupied, but only one of which is preferred for guest use. The parking assistant device may send the one or more messages based on recognizing that the autonomous vehicle is associated with a guest, e.g., based on receiving a message from the autonomous vehicle, where the message contains a vehicle identifier, vehicle size information, or other information distinguishing the autonomous vehicle from a non-guest vehicle. In response to the one or more messages from the parking assistant device, the autonomous vehicle self-parks into the guest zone.

Example Parking Scenario (4): A user has configured a parking assistant device to monitor a parking area in or around the user's home. The user is currently on vacation. Prior to leaving for the vacation, the user created a rule specifying that the entire parking area is unavailable for parking during the dates that the user is on vacation. A vehicle enters and parks in the parking area during one of these dates. In response to one or more messages from the vehicle, the parking assistant determines that the vehicle is parked in an invalid zone and sends an alert, or causes an alert to be sent (e.g., via computer system 140 in FIG. 1), to the user's mobile phone. The user can receive the alert in the form of an email, text message, push message, etc. In response to the alert, the user calls their neighbor to ask the neighbor to investigate the parked vehicle.

Example Parking Scenario (5): A user has configured a first parking zone and a second parking zone adjacent to each other. Over time, a parking assistant device learns that a first vehicle (e.g., a vehicle operated by the user's spouse) tends to leave on weekday mornings before a second vehicle (e.g., a vehicle operated by the user). Based on determining that a vehicle parked in the first parking zone would interfere with the ability of a vehicle parked in the second parking zone to exit the parking area (e.g., because the only path to exit the parking area from the second parking zone goes through the first parking zone), the parking assistant device sends a message to the first vehicle recommending the first parking zone, and a message to the second vehicle recommending the second parking zone. The messages can be sent as a result of applying a rule created by the parking assistant device based on learning the parking tendencies of the first and second vehicles. Thus, embodiments of the present disclosure can be applied to facilitate vehicle shuffling. In Scenario (5), this is especially useful when the parking operations are performed autonomously, because the user and the user's spouse may be aware of each other's parking tendencies, but the autonomous agents in their vehicles may not be aware.

Figure 10:
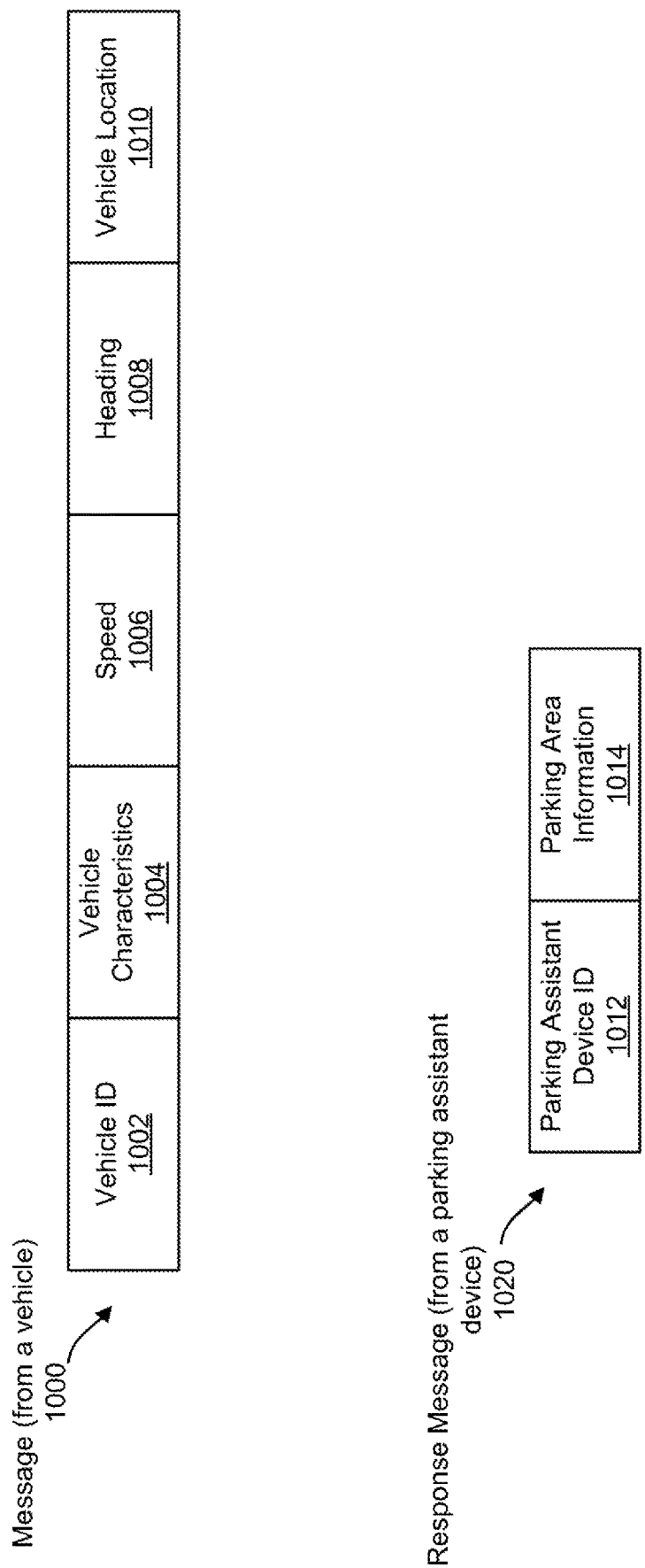
FIG. 10 illustrates example messages sent between a vehicle and a parking assistant device according to certain embodiments.

FIG. 10 illustrates example messages sent between a vehicle and a parking assistant device. In FIG. 10, a message 1000 from a vehicle includes the following items of information: a vehicle identifier (ID) 1002, vehicle characteristics 1004, a speed 1006, a heading 1008, and a vehicle location 1010. Additionally, FIG. 10 shows a response message 1020 from a parking assistant device. The response message 1020 includes a parking assistant device ID 1012 and parking area information 1014.

Vehicle ID 1002 can be a numeric or alphanumeric identifier assigned to a particular vehicle. In a standard V2X message, the vehicle ID 1002 is usually a temporary or anonymous identifier (e.g., an ID assigned each time the vehicle is powered on). In some embodiments, vehicle ID 1002 uniquely identifies the vehicle and is fixed or permanently assigned (e.g., a vehicle identification number (VIN) assigned by the vehicle's manufacturer). The vehicle ID 1002 enables a parking assistant device or other device that receives the message 1000 (e.g., a V2X receiver of another vehicle) to determine that the message 1000 is coming from a specific vehicle. In some embodiments, a parking assistant device may identify a vehicle based on a message from the vehicle, even if the vehicle is using a temporary identifier. For instance, the messages from the vehicle may be sent with certain wireless transmission characteristics that act as a signature distinguishing the vehicle from other vehicles. Thus, a vehicle can be identified based on the content of a message from the vehicle and/or based on the manner in which the message is sent from the vehicle.

Vehicle characteristics 1004 can include quantitative and/or qualitative information on the size of the vehicle. For example, vehicle characteristics 1004 can include the length and width of the vehicle or a vehicle category (e.g., sedan, compact, sport utility vehicle, commercial truck, motorcycle, etc.). Vehicle characteristics 1004 can also include the weight of the vehicle, vehicle height, and/or other physical attributes of the vehicle.

Speed 1006 indicates the current speed at which the vehicle is traveling (e.g., in miles per hour).

Heading 1008 indicates the current direction in which the vehicle is traveling (e.g., an angle between zero and three hundred and sixty degrees, or a compass direction such as north, south, northeast, etc.).

Vehicle location 1010 indicates the current location of the vehicle. Vehicle location 1010 can include, for example, GPS coordinates obtained from a GPS device onboard the vehicle.

The message 1000 can include other information about the vehicle, such as lateral acceleration, longitudinal acceleration, brake status, external temperature, current time, and the like.

Parking assistant device ID 1012 can be a numeric or alphanumeric identifier assigned to the parking assistant device. Like the vehicle ID 1002, the parking assistant device ID 1012 may or may not be a permanently assigned identifier. In some embodiments, the parking assistant device ID 1012 is a unique identifier associated with a communications interface of the parking assistant device. For example, the parking assistant device ID 1012 can be a media access control (MAC) address of a network card within the parking assistant device.

Parking area information 1014 can include one or more items of information about a parking area associated with the parking assistant device that sends the response message 1020. For example, parking area information 1014 can include GPS coordinates of the parking area and/or a parking zone in the parking area, physical dimensions of the parking area and/or parking zone, and/or other information by which the boundaries of the parking area and/or parking zone can be determined by a recipient of the response message 1020.

Parking area information 1014 can further include one or more rules by which the validity of one or more parking zones in the parking area can be determined by a recipient of the response message 1020. For example, parking area information 1014 can include times of day or dates during which a particular zone or the parking area as a whole are deemed invalid or unavailable for use even if the zone/parking area is unoccupied. As indicated earlier, a rule can include a time-based condition and/or a non-time-based condition. A rule can include multiple conditions that, when satisfied, determine whether a parking area or zone is valid or not.

In addition or as an alternative to the rule information, the parking area information 1014 may indicate a result of the parking assistant device applying one or more rules. For example, the parking area information 1014 can indicate that a parking area has no valid zones, identify a particular zone as being a preferred parking space, a particular zone as being invalid for a particular vehicle or for a particular time period, and so on. In some embodiments, the parking area information 1014 can include an indication of a navigation path to a particular parking zone, an indication of a recommended time to arrive at particular zone (e.g., a time during which the particular zone is valid) and/or other information that can potentially assist the driver or autonomous agent in making a decision regarding a parking operation.

Figure 11:
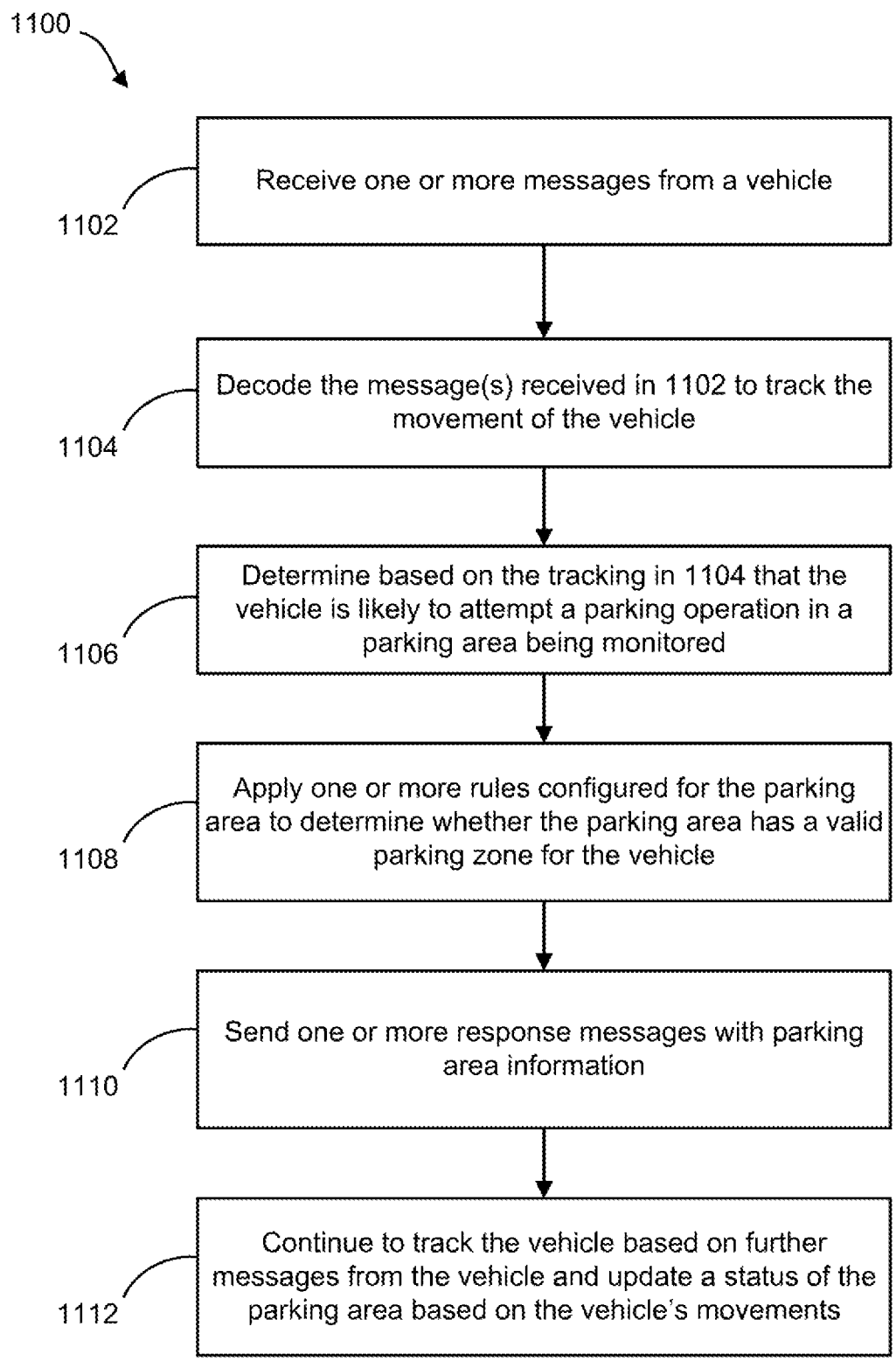
FIG. 11 is a flowchart illustrating a process for conveying parking area information to a vehicle according to certain embodiments.
Figure 12:
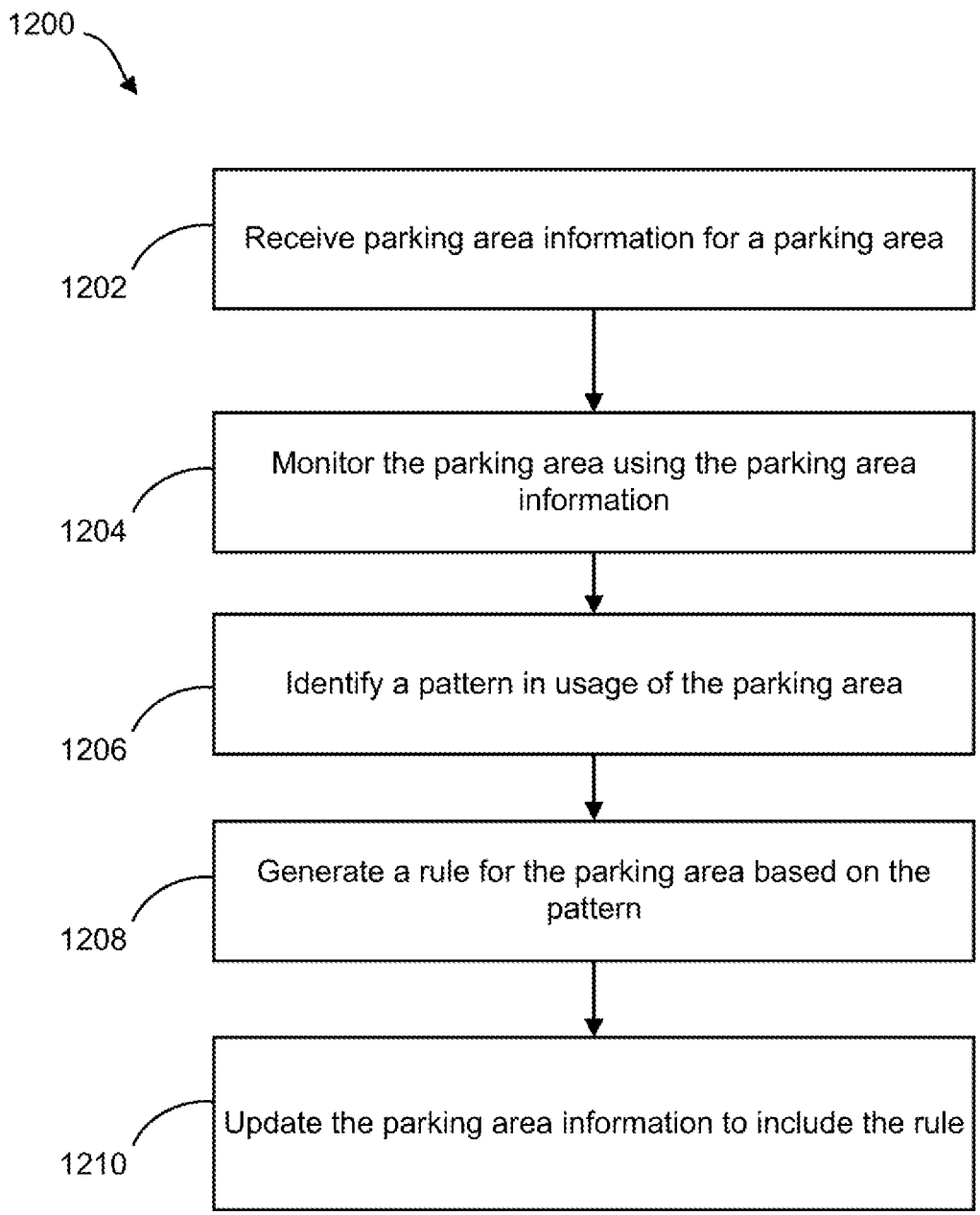
FIG. 12 is a flowchart illustrating a process for learning a parking rule according to certain embodiments.

Having described example devices and systems that can be used to implement certain embodiments, example processes that can be performed by the devices and systems will now be described in connection with FIGS. 11 and 12. The processing shown in FIGS. 11 and 12 may be implemented in software (e.g., program code) executed by one or more processors or processing units (e.g., a vehicle control unit or a processor of a parking assistant device) of the respective systems, hardware, or combinations thereof. The software may be stored on a non-transitory storage medium (e.g., on a memory device). FIGS. 11 and 12 depict various processing steps occurring in a particular sequence or order. However, in other embodiments, the steps may be performed in a different order, in parallel, or certain steps may be omitted. In certain embodiments, such as in the embodiment of FIG. 1, the processing depicted in FIGS. 11 and 12 may be performed by a parking assistant device associated with a parking area (e.g., parking assistant device 120) in conjunction with steps performed by a vehicle system (e.g., vehicle system 110).

FIG. 11 is a flowchart illustrating a process 1100 for conveying parking area information to a vehicle. At 1102, one or more messages are received from a vehicle system of a vehicle. The messages received in 1102 include information indicating a location of the vehicle and can be transmitted over a period of time while the vehicle is moving, e.g., a series of V2X messages, where each V2X message contains updated vehicle location information. As indicated earlier, vehicle messages can include additional information usable for monitoring the status of a parking area and/or determining whether a rule configured for a parking area is satisfied.

At 1104, the messages received in 1102 are decoded to track the movement of the vehicle. For instance, the parking assistant device can maintain a history of GPS coordinates for the vehicle based on GPS location information in the messages received in 1102. Other information relating to the movement of the vehicle, such as speed and heading, can also be tracked.

The tracking in 1104 can be performed as part of monitoring the status of the parking area based on movements of vehicles that communicate with the parking assistant device. This includes the messages received in 1102 as well as messages previously communicated to the parking assistant device (e.g., from other vehicles). In general, any vehicles configured to communicate with the parking assistant device (e.g., vehicles that are equipped with a V2X communications device) and are within transmission range of the parking assistant device will send at least one message indicating vehicle location. Typically, a vehicle within range of the parking assistant device will repeatedly broadcast its position until the vehicle is powered off. Thus, the parking assistant device may infer that a vehicle that moved toward a particular parking zone and then stopped communicating after the vehicle reached or neared the parking zone was parked in the parking zone. Based on this inference, the parking assistant device may update the status of the parking area to indicate that the parking zone has become occupied.

At 1106, a determination is made, based on the tracking performed in 1104, that the vehicle which sent the one or more messages in 1102 is likely to attempt a parking operation in a parking area being monitored. For example, the parking assistant device may determine that the vehicle is likely to attempt parking based on the vehicle being within a certain distance of the parking area or a particular parking zone, the vehicle traveling below a certain speed, the vehicle heading toward the parking area or particular parking zone, and/or other factors.

At 1108, one or more rules configured for the parking area are applied to determine whether the parking area has a valid zone for the vehicle to park in. More specifically, the one or more rules can include a rule for determining whether the vehicle is permitted to park in an unoccupied parking zone within the parking area (e.g., the parking area general or a particular unoccupied space that has been defined as being a parking zone). As discussed above, rules can include time-based conditions (e.g., restrictions on parking in certain zones during certain times or dates) and/or non-time-based conditions (e.g., based on one or more vehicle attributes such as vehicle size, or based on the identity of the owner/driver). The applying of the one or more rules in 1108 can be performed by the parking assistant device. The rules can be maintained locally and/or retrieved from a remote computer system such as computer system 140 in FIG. 1.

At 1110, one or more response messages are sent from the parking assistant device and in response to the one or more messages received in 1102. The response messages include parking area information and can be directed specifically to the vehicle that sent the messages in 1102 and only decodable by that vehicle (e.g., encrypted messages sent via one-to-one communication between the parking assistant device and the vehicle) or broadcast messages that can be received and decoded by any vehicle within range. The parking area information can include the one or more rules applied in 1108 and/or indicate a result of applying the one or more rules in 1108. This information can be sent in a single message or over the course of several messages.

In certain embodiments, the parking assistant device may recognize the vehicle as being associated with a client device and, based on this recognition, send additional parking area information that would not have been sent had the vehicle been unrecognized. The additional parking area information can be sent as part of the response message 1020 or in a separate message. To recognize the vehicle as being associated with the client device, the parking assistant device may receive, either prior to or during communication with the vehicle, information from the client device identifying the vehicle. An example of such additional parking area information is an indication of a parking zone reserved for exclusive use by authorized vehicles (e.g., a vehicle owned by a person associated with the parking area). This could be used to "unlock" a particular parking zone for output to the driver or for allowing an autonomous agent to take special actions with respect to parking in the parking area.

In some embodiments, the additional parking area information described above can be sent irrespective of whether the parking assistant device recognizes the vehicle, but the vehicle system of the vehicle is configured to output or use the additional parking area information only if the vehicle is associated with the client device. One way to associate the vehicle with the client device is through a pairing operation. For example, the parking manager application 250 of the client device 200 could generate a security code for display by the client device 200, and the vehicle could be associated or registered with the client device 200 by inputting the displayed security code through a human machine interface of the vehicle. Pairing can also be performed without manual input of a security code, e.g., through wireless communication between the vehicle system and the client device.

The parking area information included in the one or more response messages sent in 1110 can include information indicating the location of one or more parking zones. In certain embodiments, a map of the entire parking area is communicated to the vehicle system as part of the parking area information. Alternatively, a partial map (e.g., showing only parking zones in the immediate vicinity of the vehicle) may be communicated. In yet another embodiment, no map is communicated to the vehicle, and the parking area information simply includes information identifying the location of a valid or invalid parking zone (e.g., GPS coordinates of one or more zones). Map information is optional since the vehicle system may be equipped with navigation functionality that enables the vehicle system to determine the location of the vehicle with respect to the parking area or a parking zone (e.g., based on comparing the GPS coordinates of the vehicle to GPS coordinates provided as part of the parking area information).

In certain embodiments, the parking area information indicates a boundary of a parking area or a parking zone. For instance, a rectangular parking zone can be indicated by communicating a location within the parking zone (e.g., the center or a particular corner of the parking zone) and the dimensions (e.g., length and width) of the parking zone. Alternatively, a parking zone could be indicated using GPS coordinates for two or more corners (e.g., top left corner and bottom right corner). In some embodiments, a parking zone may be indicated as a circular area using a GPS coordinate in combination with a radius. Thus, the parking area information can permit the vehicle system to determine the shape of an indicated parking zone and where the indicated parking zone is located.

Upon receiving the one or more response messages, the response messages are decoded by the vehicle system that sent the messages in 1102 to extract the parking area information. The extracted parking area information is then processed by the vehicle system and in connection with a parking operation, which can be an autonomous parking operation or a manually performed parking operation. For example, the processing of the parking area information can involve presenting at least some of the information on an audio or visual output device (e.g., a display or loudspeaker) of the vehicle, prior to the performance of the parking operation, during performance of the parking operation, or both. Alternatively or additionally, the processing of the parking area information can involve determining, using the parking area information, an autonomous driving maneuver performed as part of the parking operation. For example, an autonomous agent of the vehicle system can identify a trajectory or series of autonomous driving maneuvers, along with associated driving parameters (amount of acceleration, steering, braking, etc.) that when executed bring the vehicle to a stop in an unoccupied parking zone.

The parking operation performed in connection with the processing of the parking area information does not necessarily involve parking the vehicle in an unoccupied parking zone associated with the rule(s) applied in 1108. In general, the driver or autonomous agent has freedom to choose an appropriate course of action taking into consideration the parking area information. For example, if the parking area information indicates that the unoccupied zone is invalid based on the one or more rules, the driver or autonomous agent can choose to park somewhere else. In some instances, there may be multiple unoccupied zones that are valid and it is up to the driver or autonomous agent to decide which of the unoccupied zones to park in, even if one of the unoccupied zones is indicated as being preferred over the other unoccupied zones.

At 1112 tracking of the movement of the vehicle is continued based on further messages received from the vehicle, and the status of the parking area is updated accordingly to reflect the vehicle's movements. For instance, after becoming parked in an unoccupied zone or some other location in the parking area, the vehicle may send one or more additional messages with location information before being powered off. Based on a most recent location of the vehicle as indicated by the one or more additional messages, the parking assistant device may determine that the vehicle has become parked in a particular location within the parking area. For example, upon determining that the vehicle has become parked in an unoccupied parking zone, the parking assistant device can update the status of the parking area to reflect that the unoccupied parking zone is no longer unoccupied. Additionally, this parking event could trigger an alert to a user associated with the parking area (e.g., if the vehicle became parked in an invalid zone).

FIG. 12 is a flowchart illustrating a process 1200 for learning a parking rule. As indicated above, in certain embodiments, rules regarding which zones are valid or invalid can be learned in an automated manner. For instance, in some embodiments, a machine learning algorithm is executed by a parking assistant device or a remote computer in communication with the parking assistant device to learn, based on observations regarding parking behavior of one or more vehicles, which zones exist besides those that have already been defined and/or conditions for when zones are valid/invalid. For example, if a homeowner typically parks in a particular zone, a rule can be learned that the particular zone is reserved for the homeowner. If a guest vehicle approaches the parking area, the guest vehicle can then be directed to park in a different zone.

At 1202 parking area information (e.g., the parking area information 144 in FIG. 1) is received. The parking area information received in 1202 comprises information on the location of a parking area and at least one parking zone in the parking area. The parking area information may further comprise one or more rules that have been configured for the parking area. The parking area information can be received as part of an initial set up or configuration of a parking area by a user, and may be communicated directly to a parking assistant device or sent to the parking assistant device through a remote computer system (e.g., computer system 140). Additionally, parking area information can be periodically sent to the parking assistant device, e.g., based on reconfiguration by the user.

At 1204, the parking area is monitored using the parking area information received in 1202. For instance, the parking assistant device can use the parking area information to identify the locations of particular zones and to determine which rules to apply. Monitoring can involve tracking the movements of vehicles based on messages sent from the vehicles. For instance, as discussed above in connection with FIG. 11, the most recent location of a vehicle can be used to identify where the vehicle has become parked.

As discussed above in connection with FIG. 3, a parking assistant device can include one or more sensor controllers. For instance, the parking area may be equipped with one or more surveillance cameras that transmit a live video stream of the parking area to the parking assistant device. Therefore, the monitoring in 1204 may involve communication with one or more sensors configured to collect data about the physical environment around the parking area (e.g., a camera, a microphone, a proximity sensor, a motion sensor, etc.). This would enable the parking assistant device to more accurately determine the status of the parking area, especially if the parking area is visited by a vehicle not capable of communicating with the parking assistant device (e.g., a vehicle without a V2X communications device).

At 1206, a pattern in usage of the parking area is identified. For example, if a homeowner parks their vehicle in the same location on a regular basis, then the parking assistant device may identify the location as being a frequently used zone. The parking assistant device could further identify the zone as being used at particular times and/or by particular vehicles (e.g., based on vehicle identifier, vehicle size information, or other information communicated in vehicle messages). For instance, a homeowner's vehicle may broadcast messages indicating that a vehicle of a certain size enters from and/or exits a particular zone on a regular basis (e.g., around the same time during weekdays, and as observed over a period of one week or longer). From this information, the parking assistant device could determine that the same vehicle tends to park in the particular zone at specific times. Further, if the vehicle is parked overnight or for an extended period of time, then the parking assistant device may infer that the vehicle belongs to the homeowner or other person associated with the parking area.

At 1208, a rule is generated for the parking area based on the pattern identified in 1206. The rule can pertain to the parking area in general (e.g., times during which the entire parking area is deemed unavailable for parking) or for a particular zone in the parking area.

Automated or machine learning is not limited to specifying that a predefined zone is valid or invalid, but can also be used for creating a new zone that has not yet been defined. For instance, if one or more vehicles repeatedly park in the same location within the parking area, and the location has not been defined as being a zone, then the parking assistant device can update the map of the parking area to indicate that the location is a zone and to create a rule for this zone. In certain embodiments, the parking assistant device may implement automated learning using a neural network or a machine learning algorithm. For instance, the parking assistant device can execute a neural network configured to determine, based on observations about vehicle size, information about the layout of the parking area, time of day information (e.g., timestamps of parking events), and other relevant information as inputs to determine whether a particular location corresponds to a parking zone, whether a particular zone should be associated with a particular vehicle, and/or a rule indicating under what conditions a zone should be deemed valid or invalid.

At 1210, the parking area information received in 1202 is updated to include the rule generated in 1208. For instance, if the parking area information is being maintained by the computer system 140, the parking assistant device may send the rule to the computer system 140 for storage. Alternatively or additionally, the parking assistant device can store the rule and the parking area information locally.

In certain embodiments, rules created by a parking assistant device based on automated learning are communicated to a user associated with the parking area in order to obtain input from the user for confirming whether the rules should be saved. For instance, each time a rule is automatically generated, the parking assistant device may communicate a message to the computer device of the user (e.g., client device 150). The message may, for example, ask the user to confirm that a zone learned by the parking assistant device is in fact a valid parking zone, or the message may ask the user to confirm or modify the times or other conditions for which the zone is valid.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A system in a vehicle, the system comprising:
a communications interface; and
a vehicle control system including one or more processors configured to:
transmit, to a computer device associated with a parking area and through the communications interface, one or more messages indicating a location of the vehicle;
receive, through the communications interface, one or more response messages from the computer device, wherein the one or more response messages include information about the parking area, and wherein the information includes a rule comprising one or more conditions that must be satisfied in order for the vehicle to be permitted to park in an unoccupied parking zone within the parking area;
decode the one or more response messages to extract the information, including the one or more conditions; and
process the information in connection with a parking operation, wherein to process the information, the vehicle control system is configured to:
present the information on an audio or visual output device of the vehicle, the information being presented prior to performance of the parking operation, during performance of the parking operation, or both; or
determine, using the information, an autonomous driving maneuver performed as part of the parking operation.

2. The system of claim 1, wherein the one or more messages indicating the location of the vehicle comprise a vehicle-to-everything (V2X) message broadcasted by the system, and wherein the one or more response messages comprise a V2X message broadcasted by the computer device.

3. The system of claim 1, wherein the information included in the one or more response messages indicates whether the vehicle is permitted, based on a result of applying the rule, to park in the unoccupied parking zone within the parking area.

4. The system of claim 1, wherein the parking area includes multiple unoccupied parking zones, and wherein the information indicates a particular unoccupied parking zone as being preferred.

5. The system of claim 1, wherein the one or more conditions include a time-based restriction on parking.

6. The system of claim 1, wherein the one or more conditions include a parking restriction relating to an attribute of the vehicle or relating to an identity of an owner or driver of the vehicle.

7. The system of claim 1, wherein:
to process the information, the vehicle control system is configured to determine, using the information, the autonomous driving maneuver performed as part of the parking operation; and
the vehicle control system is configured to perform the parking operation autonomously as a self-parking operation that parks the vehicle into the unoccupied parking zone.

8. The system of claim 1, wherein:
to process the information, the vehicle control system is configured to determine, using the information, the autonomous driving maneuver performed as part of the parking operation; and
the vehicle control system is configured to perform the parking operation autonomously as a self-parking operation that parks the vehicle into a different parking zone than the unoccupied parking zone.

9. A method comprising:
transmitting, from a vehicle system of a vehicle to a computer device associated with a parking area, one or more messages indicating a location of the vehicle;
receiving, by the vehicle system, one or more response messages from the computer device, wherein the one or more response messages include information about the parking area, and wherein the information includes a rule comprising one or more conditions that must be satisfied in order for the vehicle to be permitted to park in an unoccupied parking zone within the parking area;
decoding, by the vehicle system, the one or more response messages to extract the information, including the one or more conditions; and
processing, by the vehicle system, the information in connection with a parking operation, wherein the processing comprises:
presenting the information on an audio or visual output device of the vehicle, the information being presented prior to performance of the parking operation, during performance of the parking operation, or both; or
determining, using the information, an autonomous driving maneuver performed as part of the parking operation.

10. The method of claim 9, wherein the one or more messages from the vehicle system comprise a vehicle-to-everything (V2X) message broadcasted by the vehicle system, and wherein the one or more response messages comprise a V2X message broadcasted by the computer device.

11. The method of claim 9, wherein the information included in the one or more response messages indicates whether the vehicle is permitted, based on a result of applying the rule, to park in the unoccupied parking zone within the parking area.

12. The method of claim 9, wherein the parking area includes multiple unoccupied parking zones, and wherein the information indicates a particular unoccupied parking zone as being preferred.

13. The method of claim 9, wherein the one or more conditions include a time-based restriction on parking.

14. The method of claim 9, wherein the one or more conditions include a parking restriction relating to an attribute of the vehicle or relating to an identity of an owner or driver of the vehicle.

15. The method of claim 9, wherein the parking operation is an autonomously performed self-parking operation that parks the vehicle into the unoccupied parking zone, and wherein the processing of the information in connection with the parking operation comprises determining, using the information, the autonomous driving maneuver performed as part of the parking operation.

16. The method of claim 9, wherein the parking operation is an autonomously performed self-parking operation that parks the vehicle into a different parking zone than the unoccupied parking zone, and wherein the processing of the information in connection with the parking operation comprises determining, using the information, the autonomous driving maneuver performed as part of the parking operation.

17. The method of claim 9, wherein the information about the parking area indicates a boundary of the unoccupied parking zone.

18. The method of claim 9, wherein the one or more conditions are determined based on identification, by the computer device, of a pattern in usage of the parking area.

19. A non-transitory computer-readable storage medium containing instructions that, when executed by one or more processors in a vehicle system of a vehicle, configure the vehicle system to:
- transmit, to a computer device associated with a parking area, one or more messages indicating a location of the vehicle;
- receive one or more response messages from the computer device, wherein the one or more response messages include information about the parking area, and wherein the information includes a rule comprising one or more conditions that must be satisfied in order for the vehicle to be permitted to park in an unoccupied parking zone within the parking area;
- decode the one or more response messages to extract the information, including the one or more conditions; and
- process the information in connection with a parking operation, wherein the processing comprises:
  - presenting the information on an audio or visual output device of the vehicle, the information being presented prior to performance of the parking operation, during performance of the parking operation, or both; or
  - determining, using the information, an autonomous driving maneuver performed as part of the parking operation.

\* \* \* \* \*